(12) United States Patent
Kagata

(10) Patent No.: US 10,730,302 B2
(45) Date of Patent: Aug. 4, 2020

(54) AQUEOUS INK JET INK COMPOSITION, INK JET RECORDING METHOD, AND METHOD FOR CONTROLLING INK JET RECORDING APPARATUS

(71) Applicant: Seiko Epson Corporation, Tokyo (JP)

(72) Inventor: Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 8 days.

(21) Appl. No.: 15/946,996

(22) Filed: Apr. 6, 2018

(65) Prior Publication Data

US 2018/0291217 A1 Oct. 11, 2018

(30) Foreign Application Priority Data

Apr. 7, 2017 (JP) .................. 2017-076753

(51) Int. Cl.
*C09D 11/322* (2014.01)
*C09D 11/10* (2014.01)
(Continued)

(52) U.S. Cl.
CPC ........... *B41J 2/1652* (2013.01); *B41J 2/2107* (2013.01); *C09D 11/10* (2013.01); *C09D 11/322* (2013.01); *C09D 11/326* (2013.01); *C09D 11/54* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/161; B41J 2/1623; B41J 2202/00; B41J 2202/03; B41J 2/14201; B41J 2/045; B41J 2/04588; B41J 2/04595; B41J 2/04586;
(Continued)

(56) References Cited

U.S. PATENT DOCUMENTS 6,536,894 B1 * 3/2003 Rasmussen ............ B41J 11/002
271/276
6,783,226 B2 * 8/2004 Szlucha .................. B41J 11/002
219/50
(Continued)

FOREIGN PATENT DOCUMENTS

EP 3272818 A1 1/2018
JP 2004-189879 A 7/2004
(Continued)

OTHER PUBLICATIONS

Extended European Search Report for Patent Application No. EP18166151.3 dated Jun. 20, 2018 (8 pages).

*Primary Examiner* — Manish S Shah
(74) *Attorney, Agent, or Firm* — Harness, Dickey & Pierce, P.L.C.

(57) ABSTRACT

An aqueous ink jet ink composition contains a pigment dispersed with a dispersant resin, resin fine particles, water, and an organic solvent. The aqueous ink jet ink composition does not contain more than 5% by mass of an organic solvent having a normal boiling point of 280° C. or more. Further, a viscosity increase rate of the aqueous ink jet ink composition is within 200% at 20° C. when 20% by mass of the water evaporates, and a difference in the SP values between the dispersant resin and a resin of the resin fine particles is within 2.

18 Claims, 1 Drawing Sheet

(51) Int. Cl.
*B41J 2/165* (2006.01)
*C09D 11/326* (2014.01)
*C09D 11/54* (2014.01)
*B41J 2/21* (2006.01)

(58) Field of Classification Search
CPC .. B41J 2/14274; B41J 11/0015; B41J 11/002; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/00; B41M 5/0011; B41M 5/0017; B41M 5/0047; B41M 7/00; B41M 7/0072; B41M 5/52; B41M 5/5218; B41M 5/025; B41M 5/03; B41N 10/00
See application file for complete search history.

(56) References Cited

U.S. PATENT DOCUMENTS

| | | | |
|---|---|---|---|
| 2002/0002930 A1* | 1/2002 | Yamashita | C09D 11/322 106/31.6 |
| 2003/0043245 A1* | 3/2003 | Yamashita | C09D 11/322 347/100 |
| 2005/0231575 A1 | 10/2005 | Bannai et al. | |
| 2009/0232989 A1 | 9/2009 | Tojo | |
| 2011/0050795 A1* | 3/2011 | Arai | C09B 67/0013 347/28 |
| 2012/0133702 A1 | 5/2012 | Kojima | |
| 2012/0320124 A1 | 12/2012 | Saito et al. | |
| 2013/0038664 A1 | 2/2013 | Kagata et al. | |
| 2013/0079447 A1 | 3/2013 | Koike et al. | |
| 2016/0046816 A1* | 2/2016 | Takahashi | C09D 11/326 347/102 |
| 2016/0082726 A1* | 3/2016 | Yoneyama | B41J 2/04586 347/9 |
| 2017/0137651 A1* | 5/2017 | Watanabe | C09D 11/02 |
| 2017/0166764 A1* | 6/2017 | Katsuragi | B41J 2/14016 |
| 2017/0210919 A1* | 7/2017 | Yoshimasa | B41J 2/01 |
| 2017/0313896 A1* | 11/2017 | Katsuragi | C09D 11/108 |
| 2018/0030300 A1* | 2/2018 | Ohta | B41J 2/01 |

FOREIGN PATENT DOCUMENTS

| | | |
|---|---|---|
| JP | 2006-016412 A | 1/2006 |
| JP | 2011-201230 A | 10/2011 |
| JP | 2012-116005 A | 6/2012 |
| JP | 2013-035984 A | 2/2013 |
| JP | 2013-188958 A | 9/2013 |
| WO | WO-2016-152580 A1 | 9/2016 |

* cited by examiner

AQUEOUS INK JET INK COMPOSITION, INK JET RECORDING METHOD, AND METHOD FOR CONTROLLING INK JET RECORDING APPARATUS

BACKGROUND

1. Technical Field

The present invention relates to an aqueous ink jet ink composition, an ink jet recording method, and a method for controlling an ink jet recording apparatus.

2. Related Art

An ink jet recording method is known which discharges minute ink droplets from nozzles of an ink jet head of an ink jet recording apparatus to record images on a recording medium, and the use thereof in the sign printing field and the high-speed label printing field has also been examined. When an image is recorded on low-ink-absorbing recording media (for example, art paper and coated paper) or non-ink-absorbing recording media (for example, plastic film), the use of an aqueous ink jet ink composition (hereinafter also referred to as "aqueous ink" or "ink") containing a resin emulsion has been examined as an ink from the viewpoint of global environmental health, safety for human bodies, and the like. When recording is performed using an aqueous resin ink composition, there is a problem of achieving both discharge reliability of an ink and film formability (fixability) of an ink coating film which is applied to the surface of a recording medium.

In order to prevent the clogging of an ink jet head due to drying and to obtained the discharge reliability of the ink in recording, a high boiling point solvent needs to be added to an aqueous ink. However, when the high boiling point solvent is added to an ink, the drying properties of the ink applied to a recording medium decreases. Particularly for a non-absorbing recording medium, sufficient image quality or abrasion resistance cannot be obtained due to a reduction in the drying properties of the ink. In order to increase the drying rate of the ink on a recording medium and to increase the abrasion resistance, a technique using an ink free of the high boiling point solvent, such as glycerol, is known (for example, JP-A-2012-116005).

However, in the ink free of a high boiling point solvent, water quickly dries, and, when the drying proceeds, the dispersion stability of a pigment and resin fine particles in the ink are impaired, so that the ink viscosity increases. Thus, when the viscosity of the ink increases in the drying of the ink, the resin melts in the ink jet head and causes clogging which decreases discharge reliability.

SUMMARY

An advantage of some aspects of the invention is to solve at least some of the above-described problems to thereby provide an aqueous ink jet ink composition, an ink jet recording method, and a method for controlling an ink jet recording apparatus capable of forming an image that is excellent in abrasion resistance and excellent in discharge reliability.

The present invention has been made in order to solve at least some of the above-described problems and can be realized as the following aspects or application examples.

Application Example 1

An aqueous ink jet ink composition according to one aspect of the present invention is an aqueous ink jet ink composition containing a pigment dispersed with a dispersant resin, resin fine particles, water, and an organic solvent, in which the aqueous ink jet ink composition does not contain an organic solvent having a normal boiling point of 280° C. or more in a content exceeding 5% by mass, a viscosity increase rate at 20° C. when 20% by mass of the water contained in the aqueous ink jet ink composition evaporates is within 200%, and one in which a difference in the SP values between the dispersant resin and a resin of the resin fine particles is within 2 is contained.

According to the above-described application example, due to the fact that one in which a difference in the SP values between the dispersant resin and the resin of the resin fine particles is 2 is contained, the dispersant resin and the resin of the resin fine particles for fixation are likely to be welded, an image excellent in smooth film formability and abrasion resistance can be formed on a recording medium. On the other hand, the resins are likely to be welded within an ink jet head to form large particles but, due to the fact that the viscosity increase rate at 20° C. when 20% by mass of the water contained in the aqueous ink jet ink composition evaporates is within 200%, an ink excellent in clogging resistance is obtained and, even when the drying of an ink proceeds within the ink jet head, the discharge reliability of the ink jet head is secured. Therefore, an aqueous ink jet ink composition capable of achieving both ink discharge reliability and an image excellent in abrasion resistance can be provided.

Application Example 2

In the above-described application example, the number of particles having a particle diameter of 20 μm or more contained in the aqueous ink jet ink composition when 20% by mass of the water contained in the aqueous ink jet ink composition evaporates can be 50 particles/ml or less.

According to the above-described application example, the clogging resistance of the ink is further improved, and, even when the drying of the ink proceeds within the ink jet head, an ink jet recording method excellent in discharge reliability can be provided.

Application Example 3

In the above-described application example, the number of particles having a particle diameter of 20 μm or more contained in the aqueous ink jet ink composition when 40% by mass of the water contained in the aqueous ink jet ink composition evaporates can be 1000 particles/ml or less.

According to the above-described application example, the clogging resistance of the ink is further improved, and, even when the drying of the ink further proceeds within the ink jet head, an ink jet recording method excellent in discharge reliability can be provided.

Application Example 4

The content of an organic solvent in which the difference in the SP value from the dispersant resin or the resin of the resin fine particles is within 2 can be 20% by mass or less.

According to the above-described application example, an image more excellent in smooth film formability and more excellent in abrasion resistance can be formed on a recording medium.

Application Example 5

In the above-described application example, the content of an organic solvent in which the difference in the SP values between the dispersant resin and the resin of the resin fine particles is within 2 can be 10% by mass or less.

The above-described application example can provide an ink jet recording method capable of forming an image more excellent in abrasion resistance and excellent in discharge reliability.

Application Example 6

In the above-described application example, the difference in the SP values between the dispersant resin and the resin of the resin fine particles can be 0.5 or more and 2 or less.

The above-described application example can provide an ink jet recording method capable of forming an image more excellent in abrasion resistance and excellent in discharge reliability.

Application Example 7

An ink jet recording method according to one aspect of the present invention includes an ink composition application process of discharging an ink composition charged into a pressure chamber of an ink jet head through a nozzle to be caused to be applied to a recording medium, in which the ink jet head has a level difference ranging from a portion where the ink composition moves toward the nozzle from the pressure chamber to the nozzle and the ink composition is the aqueous ink jet ink composition according to any one of the application example 1 to the application example 6.

The above-described application example can provide an ink jet recording method which can form an image excellent in abrasion resistance because the film formability of an ink coating film is improved in recording using the ink jet head having a level difference nozzle and which is excellent discharge reliability even when the drying of the ink proceeds within the ink jet head because an ink excellent in clogging resistance is used.

Application Example 8

In the above-described application example, a process of applying a reaction liquid to the recording medium can be provided.

According to the above-described application example, the image quality is improved by providing the process of applying a reaction liquid to the recording medium.

Application Example 9

In the above-described application example, when the ink composition is caused to be applied to the recording medium, the ink composition can be caused to be applied to the recording medium which is heated in the ink composition application process.

According to the above-described application example, by causing the ink composition to be applied to the heated recording medium when the ink composition is caused to be applied to the recording medium in the ink composition application process, the drying properties of the ink composition on the recording medium increase, and therefore the occurrence of bleeding is suppressed and the film formability of an ink coating film is improved, so that an image excellent in image quality and abrasion resistance can be formed.

Application Example 10

In the above-described application example, the ink jet head can have a nozzle density of 300 dpi or more.

The above-described application example can provide an ink jet recording method capable of forming an image excellent in abrasion resistance and having excellent discharge reliability also when the ink jet head has a nozzle density of 300 dpi or more.

Application Example 11

A method for controlling an ink jet recording apparatus according to one aspect of the present invention includes, in an ink jet recording apparatus performing control to perform recording by the ink jet recording method according to any one of the application example 7 to the application example 10, performing recording for 1 hour or more without performing a cleaning process of discharging the ink composition from the ink jet head by the action from the outside of the ink jet head.

According to the above-described application example, in the recording apparatus performing recording by the ink jet recording method of any one of the application example 7 to the application example 10, although the recovery force from suction cleaning, pressurization/discharging, or the like, is high, recording can be performed for 1 hour or more without performing a cleaning process interrupting the recording, and therefore ink jet recording capable of forming an image excellent in abrasion resistance can be performed for 1 hour or more.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a preferable embodiment of the invention is described. The embodiment described below describes an example of the invention. Moreover, the invention is not limited to the following embodiment, and also includes various modifications implemented in the range where the scope of the invention is not altered.

An aqueous ink jet ink composition according to this embodiment contains a pigment dispersed with a dispersant resin, resin fine particles, water, and an organic solvent, in which the aqueous ink jet ink composition does not contain an organic solvent having a normal boiling point of 280° C. or more in a content exceeding 5% by mass, the viscosity increase rate at 20° C. when 20% by mass of the water contained in the aqueous ink jet ink composition evaporates is within 200%, and one in which a difference in the SP values between the dispersant resin and a resin of the resin fine particles is within 2 is contained.

An ink jet recording method according to this embodiment includes an ink composition application process of discharging an ink composition charged into a pressure chamber of an ink jet head through a nozzle to be caused to be applied to a recording medium, in which the ink jet head has a level difference ranging from a portion where the ink composition moves toward the nozzle from the pressure chamber to the nozzle and the ink composition is the aqueous ink jet ink composition according to this embodiment.

A method for controlling an ink jet recording apparatus according to this embodiment includes, in an ink jet recording apparatus performing control to perform recording by the ink jet recording method according to this embodiment, performing recording for 1 hour or more without performing a cleaning process of discharging the ink composition from the ink jet head by the action from the outside of the ink jet head.

Hereinafter, with respect to the aqueous ink jet ink composition, the ink jet recording method, and the method for controlling an ink jet recording apparatus according to this embodiment, the ink jet recording apparatus, an aqueous ink jet ink composition (hereinafter also referred to as "ink"), a reaction liquid, a recording medium, and the ink jet recording method are described in this order.

1. Each Configuration

1.1. Ink Jet Recording Apparatus

An example of an ink jet recording apparatus by which a recording method according to this embodiment is implemented is described with reference to the drawings. The ink jet recording apparatus usable for the recording method according to this embodiment is not limited to the following aspects.

Figure 1:
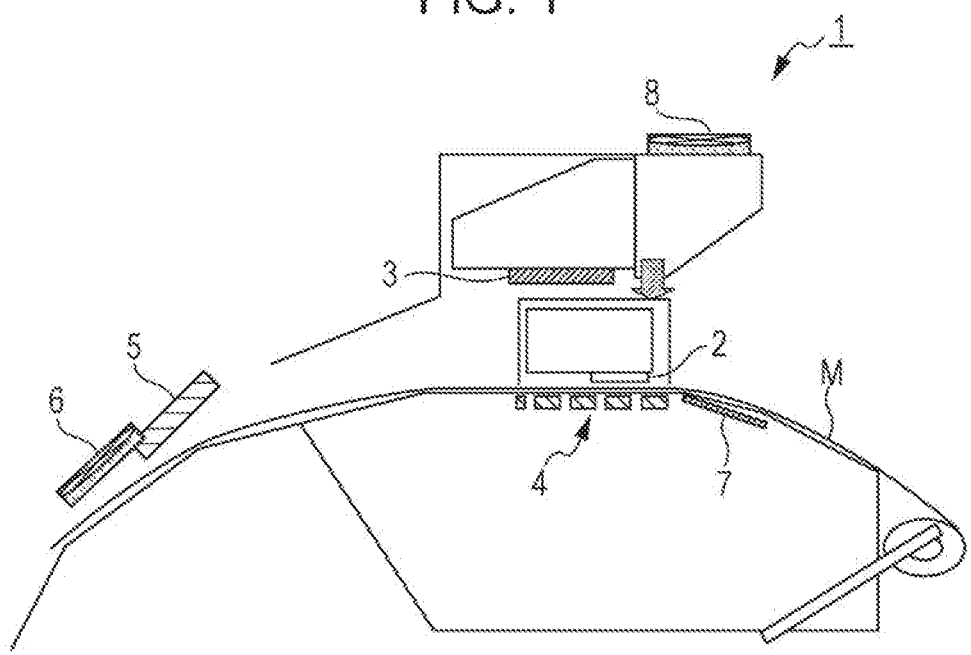
FIG. 1 is a schematic cross sectional view schematically illustrating an ink jet recording apparatus.

An example of the ink jet recording apparatus usable for the ink jet recording apparatus to be used in this embodiment is described with reference to the drawings. FIG. 1 is a schematic cross sectional view schematically illustrating an ink jet recording apparatus. As illustrated in FIG. 1, an ink jet recording apparatus 1 has an ink jet head 2, an IR heater 3, a platen heater 4, a curing heater 5, a cooling fan 6, a preheater 7, and a ventilation fan 8. The ink jet recording apparatus 1 has a control unit which is not illustrated, and the control unit controls an operation of the entire ink jet recording apparatus 1.

Figure 2:
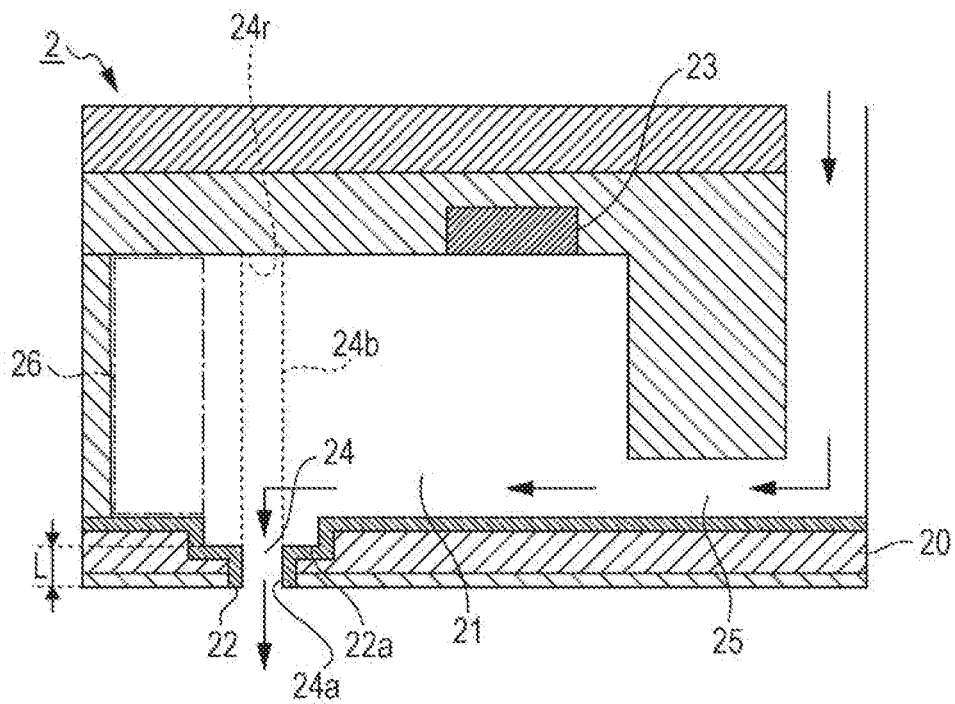
FIG. 2 is a schematic cross sectional view schematically illustrating the structure of the ink jet head illustrated in FIG. 1.

The ink jet head 2 is a unit discharging an ink composition to be caused to be applied to a recording medium M and a type illustrated in FIG. 2 is usable, for example.

The ink jet head 2 has a nozzle 22 discharging the ink composition. An ink is discharged toward the recording medium M from a nozzle opening 24a which is a tip portion of the nozzle 22. Examples of systems discharging an ink from a nozzle include, for example, a system including applying a strong electric field between the nozzle and an accelerating electrode placed ahead the nozzle, continuously discharging an ink in the form of liquid droplets from the nozzle, and then discharging the ink in response to a record information signal while the ink liquid droplets fly between deflecting electrodes (electrostatic suction system); a system including applying pressure with a small pump to an ink, and then mechanically vibrating the nozzle with a quartz oscillator or the like to thereby forcibly discharge ink liquid droplets; a system including simultaneously applying pressure and a record information signal with a piezoelectric element to discharge.record ink liquid droplets (piezoelectric system); a system including heating and foaming an ink with a microelectrode in response to a record information signal to discharge.record ink liquid droplets (thermal jet system), and the like.

As the ink jet head 2, both a line type ink jet head and a serial type ink jet head are usable.

Herein, an ink jet recording apparatus having the serial type ink jet head performs recording by performing scanning (pass) of discharging the ink composition while moving an ink jet head for recording relatively to a recording medium two or more times. Specific examples of the serial type ink jet head include one in which the ink jet head is mounted on a carriage moving in the width direction of a recording medium (direction crossing the transportation direction of the recording medium) and which discharges liquid droplets to the recording medium by the movement of the ink jet head moves in connection with the movement of the carriage.

On the other hand, an ink jet recording apparatus having the line type ink jet head performs recording by performing scanning (pass) of discharging the ink composition while moving an ink jet head for recording relatively to a recording medium once. Specific examples of the line type ink jet head includes one in which the ink jet head is formed so as to be wider than the width of a recording medium and which discharges liquid droplets onto a recording medium without involving the movement of a head for recording.

In this embodiment, an ink jet recording apparatus having the serial type ink jet head is used as the ink jet recording apparatus 1 and the ink jet head 2 utilizing the piezoelectric system as a system of discharging an ink from a nozzle is used.

FIG. 2 is a schematic cross sectional view schematically illustrating the structure of the ink jet head 2. In FIG. 2, arrows indicate the movement direction of an ink in the ink jet head 2. The ink jet head 2 has a pressure chamber 21 and a piezoelectric element 23 selectively applying pressure to the pressure chamber 21 to discharge an ink composition from the nozzle 22. The piezoelectric element 23 is disposed at a location other than a position 24r facing an outlet port 24 communicating with the nozzle 22 in the pressure chamber 21. When the piezoelectric element 23 is provided immediately above the nozzle 22 (aligned with the nozzle 22), the extrusion force of the ink from the piezoelectric element 23 is also directly transmitted to an ink film adhering to the nozzle opening 24a, and therefore the application of the ink film can be cancelled. However, when the piezoelectric element 23 is not provided immediately above (laterally offset from) the nozzle 22, the application of the ink film is difficult to cancel, and therefore the ink jet recording method according to this embodiment becomes useful.

Herein, the position 24r facing the outlet port 24 communicating with the nozzle 22 in the pressure chamber 21 means a portion aligned above the nozzle 22 and means, supposing that lines (illustrated by the dashed lines in FIG. 2) are extended toward the upper side of the figure from the nozzle opening 24a in FIG. 2, a region surrounded by an extension line 24b and an extension line 24b. For example, in the ink jet head 2 of FIG. 2, the outlet port 24 is the outlet port 24 in a portion where the area in a direction orthogonal to the direction where an ink is discharged is the same as that of the nozzle 22 and is not a portion which is enlarged in the middle. Therefore, the fact that the piezoelectric element 23 is disposed at a location other than the position 24r facing the region refers to the fact that at least one part of the piezoelectric element 23 is not located in at least one part of the position 24r facing the region.

The pressure chamber 21 has a stay portion 26 in which an ink stays in an extension direction relative to the ink movement direction connecting a supply port 25 supplying an ink to the pressure chamber 21 and the outlet port 24 of the pressure chamber 21. The stay portion 26 is a portion formed due to a process of mass-producing the ink jet head 2, and it is difficult to mass-produce the ink jet head having the pressure chamber 21 free from the stay portion 26. In the stay portion 26, an ink composition may stagnate and an ink dried substance (resin welded substance) is also likely to stay. Then, when air bubbles gather to form space, the ink dried substance adheres to the wall surface. On the other hand, according to the ink jet recording method according to this embodiment, even in the case of the ink jet head 2 having such a structure, the deposition of the ink dried substance can be reduced in the stay portion 26, and thus an ink jet recording method excellent in ink discharge reliability can be provided.

The nozzle 22 is formed in a nozzle formation plate containing a silicon single crystal of a plane orientation (110). When the nozzle formation plate 20 contains a silicon crystal, high precision processing can be achieved by a known etching process (for example, wet etching or dry etching), and the nozzle 22 is formed by a combination thereof in many cases. Therefore, when the nozzle formation plate 20 containing a silicon crystal is used, the nozzle 22 can be formed so as to have a nozzle density as high as 300 dpi or more than in a case of forming the nozzle 22 by punching or the like. The nozzle density is more preferably 360 dpi or more.

On the other hand, when the nozzle 22 is formed by etching, a level difference 22a (step or shoulder) is likely to be formed in a flow passage ranging from the pressure chamber 21 to the nozzle opening 24a where an ink passes. The level difference 22a is formed by etching a silicon layer, and therefore it is difficult to form the nozzle formation plate 20 from which the level difference 22a is canceled. The level difference 22a may be present in a range from the outlet port 24 to the nozzle opening 24a of the pressure chamber 21 and, for example, the level difference 22a is formed in a range where the distance from the nozzle opening 24a to the pressure chamber 21 is within the range of 20 μm or more and 100 μm or less. More specifically, the level difference 22a is formed by the formation of a portion where the diameter of the nozzle 22 varies in the thickness direction of the nozzle formation plate 20 in FIG. 2 but the level difference 22a is not necessarily formed in the nozzle formation plate 20 and may be formed so as to generate a level difference in the inner surface of the pressure chamber 21.

In the ink jet head 2 having such a level difference 22a, air bubbles adhere to and remain in the level difference 22a in the initial charging of an ink or cleaning in some cases, the air bubbles float from the level difference 22a to gather in an upper portion of the pressure chamber 21 during recording, the gas-liquid interface is generated there, an ink dries, and then an ink dried substance (resin welded substance) adheres to the inside of the ink jet head 2, particularly the level difference 22a or the stay portion 26. On the other hand, according to the ink jet recording method according to this embodiment, the deposition of the ink dried substance in the ink jet head 2 can be reduced even when such a level difference 22a is provided, and thus an ink jet recording method excellent in ink discharge reliability can be provided.

In this embodiment, two or more of the pressure chambers 21 and discharge actuators (not illustrated) and the nozzles 22 provided for each of the pressure chambers 21 of the ink jet head 2 may be independently provided in one head. Herein, the discharge actuator can be formed using an electromechanical conversion element, such as the piezoelectric element 23 varying the capacity of the pressure chamber 21 by mechanical deformation, an electrothermal conversion element generating air bubbles in an ink by generating heat to discharge the ink, or the like.

Returning to FIG. 1, the ink jet recording apparatus 1 has the IR heater 3 and the platen heater 4 for heating the recording medium M in the discharge of the ink composition from the ink jet head 2. When heating the recording medium M in the aqueous ink jet ink composition application process according to this embodiment, at least one of the IR heater 3 and the platen heaters 4 may be used.

When the IR heater 3 is used, the recording medium M can be heated from the ink jet head 2 side. Thus, the ink jet head 2 is also likely to be simultaneously heated but the temperature can be increased without being affected by the thickness of the recording medium M as compared with the case of being heated from the rear surface of the recording media M as in the platen heater 4 or the like. When the platen heater 4 is used in heating the recording medium M, the recording medium M can be heated from the side opposite to the ink jet head 2. Thus, the ink jet head 2 is relatively hard to be heated. However, the surface temperature of the recording medium M after heating by the IR heater 3 and the platen heater 4 is preferably 25° C. or more and 60° C. or less, more preferably 30° C. or more and 50° C. or less, and still more preferably 35° C. or more and 45° C. or less. Thus, the radiant heat received from the IR heater 3 and the platen heater 4 is less or eliminated, and therefore the drying and composition changes of the ink composition in the ink jet head 2 can be suppressed and the welding of the resin to the inner wall of the ink jet head 2 is suppressed.

The curing heater 5 dries and solidifies the ink composition recorded on the recording medium M. Due to the fact that the curing heater 5 heats the recording medium M on which an image is recorded, the moisture and the like contained in the ink composition more promptly evaporates and scatters, and then an ink film is formed by the resin fine particles contained in the ink composition. Thus, the ink film is firmly fixed (adhered) onto the recording medium M, so that the film formability is improved, and thus an excellent image having high image quality can be obtained in a short time. The drying temperature by the curing heater 5 is preferably 40° C. or more and 120° C. or less, more preferably 60° C. or more and 100° C. or less, and still more preferably 80° C. or more and 90° C. or less.

The ink jet recording apparatus 1 may have the cooling fan 6. By drying the ink composition recorded on the recording medium M, and then cooling the ink composition on the recording medium M by the cooling fan 6, an ink coating film can be formed with good adhesiveness on the recording medium M.

The ink jet recording apparatus 1 may have the preheater 7 preheating the recording medium M beforehand before the ink composition is discharged to the recording medium M. Furthermore, the recording apparatus 1 may have the ventilation fan 8 so that the ink composition adhering to the recording medium M is more efficiently dried.

1.2. Aqueous Ink Jet Ink Composition

Next, the aqueous ink jet ink composition according to this embodiment is described. The aqueous ink jet ink composition according to this embodiment contains a pigment dispersed with a dispersant resin, resin fine particles, water, and an organic solvent, in which the aqueous ink jet ink composition does not contain an organic solvent having a normal boiling point of 280° C. or more in a content exceeding 5% by mass, the viscosity increase rate is within 200% at 20° C. when 20% by mass of the water contained in the aqueous ink jet ink composition evaporates, and a difference in the SP values between the dispersant resin and a resin of the resin fine particles is within 2.

In the aqueous ink jet ink composition according to this embodiment, due to the fact that the difference in the SP values between the dispersant resin and the resin of the resin fine particles is within 2, the dispersant resin and the resin of the resin fine particles for fixation are likely to be melted, so that an image excellent in smooth film formability and abrasion resistance can be formed on a recording medium. On the other hand, the resins are likely to be welded within an ink jet head to form large particles but, due to the fact that the viscosity increase rate at 20° C. when 20% by mass of the water contained in the aqueous ink jet ink composition evaporates is within 200%, an ink excellent in clogging resistance is obtained and, even when the drying of an ink proceeds within the ink jet head, the discharge reliability of the ink jet head is secured. Therefore, an aqueous ink jet ink composition capable of achieving both ink discharge reliability and an image excellent in abrasion resistance can be provided, and the aqueous ink jet ink composition can be preferably used particularly for printing on non-ink-absorbing or low-ink-absorbing recording media. Furthermore, an ink jet recording method excellent in discharge reliability in recording using an ink jet head having a level difference nozzle can be provided. Hereinafter, components contained in the aqueous ink jet ink composition according to this embodiment are described.

1.2.1. Pigment

The aqueous ink jet ink composition according to this embodiment contains a pigment dispersed with a dispersant resin. The pigment is preferably used because the pigment has a property of being hard to fade to light, gas, and the like. An image formed on non-ink-absorbing or low-ink-absorbing recording media using the pigment is excellent in water resistance, gas resistance, lightfastness, and the like and the storageability thereof is improved.

The pigment usable in this embodiment is not particularly limited and inorganic pigments and organic pigments are acceptable. As the inorganic pigments, carbon black manufactured by known methods, such as a contact method, a furnace method, and a thermal method, is usable in addition to titanium oxide and iron oxide. On the other hand, usable as the organic pigments are azo pigments (including azo lake, insoluble azo pigments, condensed azo pigments, chelate azo pigments, and the like), polycyclic pigments (for example, phthalocyanine pigments, perylene pigments, perinone pigments, anthraquinone pigments, quinofraron pigments, and the like), a nitro pigment, a nitroso pigment, aniline black, and the like.

Among the specific examples of the pigment usable in this embodiment, carbon black is mentioned as a black pigment. Examples of the carbon black include, but are not particularly limited to, furnace black, lamp black, acetylene black, or channel black (C.I. Pigment Black 7), for example. Examples of commercially-available items thereof include No. 2300, 900, MCF88, No. 20B, No. 33, No. 40, No. 45, No. 52, MA7, MA8, MA77, MA100, No. 2200B, and the like (all Trade Names, manufactured by Mitsubishi Chemical Corporation), color black FW1, FW2, FW2V, FW18, FW200, S150, S160, and S170, Printex 35, U, V, and 140U, Special Black 6, 5, 4A, 4, and 250, and the like (all Trade Names, manufactured by Degussa), Conductex SC, Raven 1255, 5750, 5250, 5000, 3500, 1255, and 700, and the like (all Trade Names, manufactured by Columbian Carbon Japan Ltd.), Regal 400R, 330R, and 660R, Mogul L, Monarch 700, 800, 880, 900, 1000, 1100, 1300, and 1400, Elftex 12, and the like (all Trade Names, manufactured by Cabot Corporation), for example.

Examples of a white pigment include, but are not particularly limited to, white inorganic pigments, such as C.I. Pigment White 6, 18, and 21, titanium oxide, zinc oxide, zinc sulfide, antimony oxide, magnesium oxide, and zirconium oxide, for example. In addition to the white inorganic pigments, white organic pigments, such as white hollow resin particles and polymer particles, are also usable.

Pigments for use in a yellow ink include, but are not particularly limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180, for example.

Pigments for use in a magenta ink include, but are not particularly limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 or C.I. Pigment Violet 19, 23, 32, 33, 36, 38, 43, and 50, for example.

Pigments for use in a cyan ink include, but are not particularly limited to, C.I. Pigment Blue 1, 2, 3, 15, 15:1, 15:2, 15:3, 15:34, 15:4, 16, 18, 22, 25, 60, 65, and 66 and C.I. Vat Blue 4 and 60, for example.

Moreover, pigments for use in color inks other than magenta, cyan, and yellow include, but are not particularly limited to, C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63, for example.

Examples of pearl pigments include, but are not particularly limited to, pigments having pearlescent gloss and interferential gloss, such as titanium dioxide-coated mica, argentine, and acid chloride bismuth, for example.

Examples of metallic pigments include, but are not particularly limited to, particles containing aluminum, silver, gold, platinum, nickel, chromium, tin, zinc, indium, titanium, and copper alone or an alloy thereof, for example.

The content of the pigment contained in the ink composition is preferably 1.5% by mass or more and 10% by mass or less and more preferably 2% by mass or more and 7% by mass or less based on the total mass (100% by mass) of the aqueous ink jet ink composition.

In order to apply the pigment described above to the aqueous ink jet ink composition, the pigment should be able to be stably dispersed and held in water. Examples of methods therefor include a method including dispersing the pigment with a dispersant resin, such as a water-soluble resin and/or a water-dispersible resin (Hereinafter, a pigment treated by this method is referred to as "resin dispersion pigment"), a method including dispersing the pigment with a surfactant, such as a water-soluble surfactant and/or a water-dispersible surfactant (Hereinafter, a pigment treated by this method is described as "surfactant dispersion pigment"), a method including chemically/physically introducing a hydrophilic functional group into the surface of pigment particles to make the pigment dispersible and/or soluble in water without dispersants, such as the above-described resin or the above-described surfactant (Hereinafter, a pigment treated by this method is referred to as "surface treated pigment"), and the like.

In the aqueous ink jet ink composition according to this embodiment, the pigment is the resin dispersion pigment in which the pigment is dispersed with a dispersant resin, such as a water-soluble resin and/or a water-dispersible resin, but may be a mixture of the surfactant dispersion pigment and the surface treated pigment, as desired.

Examples of the dispersant resin for use in the resin dispersion pigment include polyvinyl alcohols, polyvinyl pyrrolidones, polyacrylic acids, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic ester copolymers, vinyl acetate-crotonic acid copolymers, vinyl acetate-acrylic acid copolymers, and the like and salts thereof. Among the above, copolymers of monomers having hydrophobic functional groups and monomers having hydrophilic functional groups and polymers containing monomers having hydrophobic functional groups and hydrophilic functional group are preferable. As the form of the copolymers, any form of a random copolymer, a block copolymer, an alternating copolymer, and a graft copolymer is usable.

Examples of the salts mentioned above include salts with basic compounds, such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, and morpholine. The addition amount of these basic compounds is not particularly limited insofar as the addition amount is equal to or more than the neutralization equivalent of the dispersant resin.

The molecular weight of the dispersant resin is preferably within the range of 1,000 to 100,000 and more preferably within the range of 3,000 to 10,000 as the weight average molecular weight. Due to the fact that the molecular weight is within the ranges mentioned above, a coloring material can be stably dispersed in water and the viscosity control or the like when applied to the ink composition is easily performed.

As the dispersant resin described above, commercially-available items are also usable. In detail, BYK2015 (Trade Name, manufactured by BYK Chemie Japan, Inc.), Joncryl 67, Joncryl 678, Joncryl 586, Joncryl 611, Joncryl 680, Joncryl 682, Joncryl 683, and Joncryl 690 (all Trade Names, manufactured by the BASF Japan, Inc.), and the like are mentioned.

The dispersant resin includes one in which a difference in the SP values between the dispersant resin and a resin of resin fine particles described later is within 2.

In this specification, the "SP value" is referred to as a solubility parameter. The SP value means a value calculated using the Hansen's expression given below. The Hansen solubility parameter is one such that the solubility parameter introduced by Hildebrand is divided into three components of a dispersion component $\delta d$, a polar component $\delta p$, and a hydrogen bonding component $\delta h$, and then represented in a three dimensional space. In this specification, the SP value is represented by $\delta[(cal/cm^3)^{0.5}]$, and a value calculated using the following expression is used.

$$\delta[(cal/cm^3)^{0.5}]=(\delta d^2+\delta p^2+\delta h^2)^{0.5}$$

A large number of the dispersion components $\delta d$, the polar components $\delta p$, and the hydrogen bonding components $\delta h$ are determined by Hansen and his research successors and are described in Polymer Handbook (fourth edition), VII-698 to 711. Hansen solubility parameters regarding a large number of solvents and resins have been investigated, and for example, the solubility parameters are described in Industrial Solvents Handbook (written by Wesley L. Archer).

Due to the fact that the aqueous ink jet ink composition according to this embodiment contains one in which the difference in the SP values between the dispersant resin and the resin of the resin fine particles is within 2, the resins are likely to be welded and a coating film excellent in smooth film formability is recorded on the surface of a recording medium, so that the abrasion resistance is improved. On the other hand, due to the fact that the resins are likely to be welded, the resins are likely to be dissolved also in an ink jet head, and then the resins are likely to be welded to form large particles to cause clogging. Even in such a case, the aqueous ink jet ink composition according to this embodiment provides an ink excellent in clogging resistance. The upper limit of the difference in the SP values between the dispersant resin and the resin of the resin fine particles is preferably 1.5 or less, more preferably 1.2 or less, and still more preferably 1.0 or less. The lower limit of the difference in the SP values between the dispersant resin and the resin of the resin fine particles is preferably 0.5 or more, more preferably 0.6 or more, and still more preferably 0.8 or more.

The content of the dispersant resin is preferably 0.5% by mass or more and 5% by mass or less, more preferably 1% by mass or more and 4% by mass or less, and still more preferably 2% by mass or more and 3% by mass or less based on the total mass (100% by mass) of the aqueous ink jet ink composition.

Examples of the surfactant for use in the surfactant dispersion pigment include anionic surfactants, such as alkanesulfonate, α-olefin sulfonate, alkyl benzenesulfonate, alkyl naphthalene sulfonate, acyl methyl taurate, dialkyl sulfosuccinate, an alkyl sulfate ester salt, sulfonated olefin, a polyoxyethylene alkylether sulfate ester salt, an alkyl phosphate ester salt, a polyoxyethylene alkyl ether phosphate ester salt, and a monoglycerite phosphate ester salt, amphoteric surfactants, such as an alkyl pyridium salt, an alkylamino acid salt, and alkyl dimethyl betaine, and nonionic surfactants, such as polyoxyethylene alkyl ether, polyoxyethylene alkyl phenyl ether, polyoxyethylene alkylester, polyoxyethylene alkyl amide, glycerol alkylester, and sorbitan alkylester.

The addition amount to the pigment of the dispersant resin or the surfactant is preferably 1 part by mass to 100 parts by mass and more preferably 5 parts by mass to 50 parts by mass based on 100 parts by mass of the pigment. Due to the fact that the addition amount is within the ranges mentioned above, the dispersion stability of the pigment in water can be secured.

Examples of the surface treated pigment include —OM, —COOM, —CO—, —SO$_3$M, —SO$_2$NH$_3$, —RSO$_3$M, —PO$_3$HM, PO$_3$M$_3$, —SO$_3$NHCOR, —NH$_3$, —NR$_3$ (wherein, M in the formulae represents a hydrogen atom, alkali metal, ammonium, or organic ammonium and R represents an alkyl group having 1 to 12 carbon atoms, a phenyl group which may have a substituent, or a naphthyl group which may have a substituent) and the like as a hydrophilic functional group. These functional groups are physically and/or chemically introduced into the surface of the pigment particles by being grafted directly and/or through a polyvalent group. As the polyvalent group, an alkylene group having 1 to 12 carbon atoms, a phenylene group which may have a substituent, a naphthylene group which may have a substituent, or the like can be mentioned.

The surface treated pigment described above is preferably one which is surface treated so that SO$_3$M and/or —RSO$_3$M (M is a counter ion and represents a hydrogen ion, an alkali metal ion, an ammonium ion, or an organic ammonium ion) are/is chemically bonded to the surface of the pigment particles by a treatment agent containing sulfur, i.e., a pigment which is made dispersible and/or soluble in water by being dispersed in a solvent which does not have an active proton, which does not have reactivity with sulfonic acid, and in which the pigment is insoluble or hardly soluble, and then being surface treated so that —SO$_3$M and/or —RSO$_3$M are/is chemically bonded to the surface of the particles by amidosulfuric acid or a complex of sulfur trioxide and tertiary amine.

As surface treatment units grafting the functional groups mentioned above or a salt thereof to the surface of the pigment particles directly or through polyvalent groups, various known surface treatment units are applicable. For example, mentioned are a unit causing ozone or sodium hypochlorite to act on a commercially-available carbon black oxide to further subject the carbon black to oxidation treatment to further perform hydrophilization treatment of the surface thereof (for example, JP-A-7-258578, JP-A 8-3498, JP-A-10-120958, JP-A-10-195331, and JP-A-10-237349), a unit treating carbon black with 3-amino-N-alkyl-substituted pyridium bromide (for example, JP-A-10-195360 and JP-A-10-330665), a unit dispersing an organic pigment in a solvent in which the organic pigment is insoluble or hardly soluble, and then introducing a sulfone group into the surface of pigment particles with a sulfonating agent (for example, JP-A-8-283596, JP-A-10-110110, and JP-A-10-110111), a unit dispersing an organic pigment in a basic solvent forming a complex with sulfur trioxide, and then adding sulfur trioxide to thereby surface-treat the surface of the organic pigment to introduce a sulfone group or a sulfone amino group (for example, JP-A-10-110114), and the like but units for producing the surface treated pigment for use in the present invention are not limited to these units.

One or two or more kinds of functional groups may be grafted to one pigment particle. The type of the functional group to be grafted and the degree thereof may be determined as desired considering the dispersion stability in an ink, the color density, the drying properties on the front surface of an ink jet head, and the like.

A method for dispersing the resin dispersion pigment, the surfactant dispersion pigment, and the surface treated pigment described above in water can be performed by adding the pigment, water, and a dispersant resin with respect to the resin dispersion pigment, the pigment, water, and a surfactant with respect to the surfactant dispersion pigment, and the surface treated pigment and water with respect to the surface treated pigment and, as desired, a water-soluble organic solvent-neutralizer and the like to each pigment, and then performing dispersion with a disperser used heretofore, such as a ball mill, a sand mill, an attritor, a roll mill, an agitator mill, a Henschel mixer, a colloid mill, an ultrasonic homogenizer, a jet mill, and an angmill. In this case, it is preferable to perform the dispersion until the particle diameter of the pigment is in the range of 20 nm to 500 nm and more preferably in the range of 50 nm to 200 nm in terms of average particle diameter from the viewpoint of securing dispersion stability of the pigment in water.

1.2.2. Resin Fine Particles

The aqueous ink jet ink composition according to this embodiment contains water-soluble and/or water-insoluble resin fine particles. The resin of the resin fine particles has an action of solidifying an ink, and further firmly fixing an ink solidified substance onto a recording medium. The resin fine particles are in a state of being dispersed in the ink composition and is obtained by forming a resin which is hardly soluble or insoluble in a liquid medium of the aqueous ink jet ink composition according to this embodiment into a state of fine particles and dispersing the same (i.e., formed into an emulsion state or a suspension state) so as to be contained as the resin fine particles.

The resin for use in this embodiment is one in which the difference in the SP values between the resin and the dispersant resin is within 2 as described above.

Examples of the resin of the resin fine particles include polyacrylic acid ester or a copolymer thereof, polymethacrylic acid ester or a copolymer thereof, polyacrylonitrile or a copolymer thereof, polycyanoacrylate, polyacrylamide, polyacrylic acid, polymethacrylic acid, polyethylene, polypropylene, polybutene, polyisobutylene, and polystyrene or copolymers thereof, petroleum resin, cumarone.indene resin, terpene resin, polyvinyl acetate or a copolymer thereof, polyvinyl alcohol, polyvinyl acetal, polyvinyl ether, polyvinyl chloride or a copolymer thereof, polyvinylidene chloride, fluororesin, fluororubber, polyvinyl carbazole, polyvinyl pyrrolidone or a copolymer thereof, polyvinyl pyridine, polyvinyl imidazole, polybutadiene or a copolymer thereof, polychloroprene, polyisoprene, natural resin, and the like. Among the above, those having both a hydrophobic portion and a hydrophilic portion in the molecular structure are particularly preferable.

In order to obtain the resin in the fine particle state, the resin in the fine particle state is obtained by methods described below and any one of the methods may be acceptable or two or more of the methods may be combined as desired. Examples of the methods include a method including mixing a polymerization catalyst (polymerization initiator) and a dispersant in monomers configuring a desired resin to perform polymerization (i.e., emulsion polymerization), a method including dissolving a resin having a hydrophilic portion in a water-soluble organic solvent, mixing the solution in water, and then removing the water-soluble organic solvent by distillation or the like to thereby obtain the resin in the fine particles state, a method including dissolving a resin in a water-insoluble organic solvent, and then mixing the solution in an aqueous solution with a dispersant to thereby obtain the resin in the fine particles state, and the like. The above-described methods can be selected as desired according to the type and the characteristics of the resin to be used. As dispersants usable when dispersing a resin include anionic surfactants (for example, a sodium dodecylbenzenesulfonate salt, a lauryl phosphate sodium salt, a polyoxyethylene alkylether sulfate ammonium salt, and the like) and nonionic surfactants (for example, polyoxyethylene alkyl ether, polyoxyethylene alkyl ester, polyoxyethylene sorbitan fatty acid ester, polyoxyethylene alkyl phenyl ether, and the like) can be mentioned although not particularly limited to and these substance can be used alone or in combination of two or more kinds thereof.

As the resin described above, in order to use the same in the fine particle state (emulsion form, suspension form), those obtained with known materials and by known methods are also usable. For example, the substances described in JP-A-62-1426, JP-A-3-56573, JP-A-3-79678, JP-A-3-160068, JP-A-4-18462, and the like may be used. Moreover, commercially-available items are also usable. For example, mentioned are MICROGEL E-1002 and MICROGEL E-5002 (all Trade Names, manufactured by Nippon Paint Co., Ltd.), VONCOAT 4001 and VONCOAT 5454 (all Trade Names, manufactured by Dainippon Ink and Chemicals, Incorporated), SAE1014 (Trade Name, manufactured by Nippon Zeon Co., Ltd.), Saibinol SK-200 (Trade Name, manufactured by Saiden Chemical Industry Co., Ltd.), ARUFON UF-5022 (Trade Name, manufactured by TOAGOSEI CO., LTD.), JE-1056 (Trade Name, manufactured by SEIKO PMC CORPORATION), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (all Trade Names, manufactured by BASF Japan, Inc.), and the like.

In order to use the resin in the fine particle state, from the viewpoint of securing the storage stability and the discharge reliability of the ink composition, the average particle diameter thereof is preferably in the range of 5 nm or more and 400 nm or less and more preferably in the range of 50 nm or more and 200 nm or less. Due to the fact that the average particle diameter of the resin fine particles is within the ranges mentioned above, the film formability is excellent and, even when aggregating, a large lump is hard to be formed, and therefore the clogging of a nozzle can be reduced. The average particle diameter in this specification is on a volume basis unless otherwise particularly specified. As a measurement method, the average particle diameter can be measured with a particle size distribution meter employing the dynamic light scattering theory as the measurement principle, for example. Examples of such a particle size distribution meter include "Microtrac UPA" manufactured by Nikkiso Co., Ltd. and the like are mentioned, for example.

The glass transition temperature (Tg) of the resin is preferably −20° C. or more and 100° C. or less, more preferably −10° C. or more and 80° C. or less, and still more preferably 0° C. or more and 76° C. or less, for example.

The content of the resin is preferably 0.1% by mass or more and 15% by mass or less, more preferably 0.5% by mass or more and 10% by mass or less, still more preferably 2% by mass or more and 7% by mass or less, and particularly preferably 3% by mass or more and 5% by mass or less in terms of solid content based on the total mass of the ink composition. Due to the fact that the content is within the ranges mentioned above, the ink composition can be sufficiently solidified and fixed particularly on non-ink-absorbing or low-ink-absorbing recording media.

1.2.3. Water

The aqueous ink jet ink composition according to this embodiment contains water. The water is a medium serving as the main component of the aqueous ink jet ink composition and is a component which evaporates and scatters by drying. The water is preferably one from which ionic impurities are removed as much as possible, such as pure water or ultrapure water, e.g., ion exchanged water, ultrafiltration water, reverse osmosis water, and distilled water. The use of water sterilized by irradiation with ultraviolet rays, hydrogen peroxide addition, or the like is preferable because the generation of mold or bacteria can be suppressed when the aqueous ink jet ink composition is stored for a long period of time.

In the aqueous ink jet ink composition according to this embodiment, the content of the water is preferably 40% by mass or more, more preferably 50% by mass or more, still more preferably 60% by mass or more, and particularly preferably 70% by mass or more based on the total mass of the aqueous ink jet ink composition.

1.2.4. Organic Solvent

The aqueous ink jet ink composition according to this embodiment contains an organic solvent and does not contain an organic solvent having a normal boiling point of 280° C. or more in a content exceeding 5% by mass. Due to the fact that the aqueous ink jet ink composition according to this embodiment contains an organic solvent and does not contain an organic solvent having a normal boiling point of 280° C. or more in a content exceeding 5% by mass, the drying properties of the ink composition discharged onto a recording medium are improved and an image excellent in abrasion resistance can be obtained.

The organic solvent is preferably a water-soluble organic solvent. By the use of a water-soluble organic solvent, the drying properties of the ink composition are improved and an image excellent in abrasion resistance can be obtained.

Moreover, as the organic solvent, the content of an organic solvent in which the difference in the SP values between the organic solvent and the dispersant resin or the resin of the resin fine particles is within 2 is preferably 20% by mass or less. In this case, the resins might be welded within an ink jet head to form large particles but the viscosity increase rate when the water contained in the aqueous ink jet ink composition evaporates can be suppressed within 200%, so that an ink excellent in clogging resistance is obtained. The content of such an organic solvent is more preferably 15% by mass or less and still more preferably 10% by mass or less.

Examples of the water-soluble organic solvent include, but are not particularly limited to, alcohols, such as methanol, ethanol, and isopropyl alcohol; ketones or ketoalcohols, such as acetone and diacetone alcohol; ethers, such as tetrahydrofuran and dioxane; glycols, such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols, such as ethylene glycol monomethyl ether, diethylene glycol monomethyl ether, diethylene glycol monoethyl ether, and diethylene glycol monobutyl ether; amines having hydroxyl groups, such as diethanol amine and triethanol amine; nitrogen containing solvents, such as 2-pyrrolidone and N-methyl pyrrolidone; and glycerol. From the viewpoint of improving the drying properties of the aqueous ink composition, propylene glycol, 1,2-hexanediol, 1,3-butanediol, and the like are preferably used.

Moreover, the aqueous ink jet ink composition according to this embodiment preferably also contains a nitrogen containing solvent from the viewpoint of obtaining recorded matter excellent in abrasion resistance from among the water-soluble organic solvents mentioned above. As the nitrogen containing solvent, in more detail, N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like are mentioned, for example. The nitrogen containing solvent acts as a good solubilizer for the dispersant resin, the resin fine particles, and the like described above. The content of the nitrogen containing solvent is preferably 1.0% by mass or more and 15% by mass or less and more preferably 5% by mass or more and 10% by mass or less based on the total mass of the ink composition.

The total content of the water-soluble organic solvent is preferably 5.0% by mass or more and 40% by mass or less, more preferably 10% by mass or more and 35% by mass or less, and particularly preferably 15% by mass or more and 30% by mass or less based on the total mass of the ink composition.

The organic solvent having a boiling point of 280° C. or more absorbs the moisture of the ink composition to thicken the ink composition near an ink jet head in some cases, and thus reduces the discharge reliability of the ink jet head in some cases. Moreover, when the organic solvent having a boiling point of 280° C. or more is contained in a high concentration, the drying properties of the ink composition on a recording medium decrease in some cases. Therefore, the aqueous ink jet ink composition according to this embodiment does not contain the organic solvent having a normal boiling point of 280° C. or more in a content exceeding 5% by mass in the ink composition, preferably does not contain the same in a content exceeding 3% by mass, more preferably does not contain the same in a content exceeding 2% by mass, still more preferably does not to contain the same in a content exceeding 1% by mass, and particularly preferably does not contain the same in a content exceeding 0.5% by mass. When the organic solvent having a boiling point of 280° C. or more is not contained in a content exceeding 5% by mass in the ink composition, the drying properties of the ink composition on a recording medium increase, and therefore an excellent image in which the occurrence of bleeding is suppressed can be formed. Moreover, stickiness of the obtained recorded matter is reduced and the abrasion resistance thereof is improved.

Examples of the organic solvent having a boiling point of 280° C. or more include glycerol, for example. Since glycerol has high hygroscopicity and a high boiling point, glycerol causes clogging of a head or operation defects, in some cases. Moreover, glycerol has poor antiseptic properties, and thus is likely to produce mold or fungi, and therefore is not preferably contained in the ink composition.

1.2.5. Surfactant

The aqueous ink jet ink composition according to this embodiment preferably contains a surfactant. Examples of the surfactant include, but are not particularly limited to, an acetylene glycol-based surfactant, a fluorine-based surfactant, and a silicone-based surfactant, for example, and at least one of them is preferably contained.

The acetylene glycol-based surfactant is not particularly limited and is preferably one or more kinds selected from 2,4,7,9-tetramethyl-5-decyne-4,7-diol and an alkylene oxide adduct of 2,4,7,9-tetramethyl-5-decyne-4,7-diol and 2,4-dimethyl-5-decyne-4-ol and an alkylene oxide adduct of 2,4-dimethyl-5-decyne-4-ol, for example. Examples of commercially-available items of the acetylene glycol-based surfactant include, but are not particularly limited to, Olefin 104 series and E series, such as Olefin E1010 (Trade Name, manufactured by Air Products Japan, Inc.), Surfynol 465, Surfynol 61, and Surfynol DF110D (Trade Name, manufactured by Nissin Chemical Industry CO., Ltd.), and the like, for example. The acetylene glycol-based surfactants may be used alone or in combination of two or more kinds thereof.

Examples of the fluorine-based surfactant include, but are not particularly limited to, a perfluoroalkyl sulfonate salt, a perfluoroalkyl carboxylate salt, perfluoroalkyl phosphate ester, a perfluoroalkyl ethylene oxide adduct, perfluoroalkyl betaine, and a perfluoroalkyl amine oxide compound, for example. Examples of commercially-available items of the fluorine-based surfactant include, but are not particularly limited to, Surflon S-144 and S-145 (manufactured by AGC SEIMI CHEMICAL CO., LTD.); FC-170C, FC-430, and Fluorad FC4430 (manufactured by Sumitomo 3M, Inc.); FSO, FSO-100, FSN, FSN-100, and FS-300 (manufactured by Dupont); FT-250 and 251 (manufactured by Neos Co., Ltd.), and the like, for example. The fluorine-based surfactants may be used alone or in combination of two or more kinds thereof.

Examples of the silicone-based surfactant include a polysiloxane-based compound, polyether-modified organosiloxane, and the like. Specific examples of commercially-available items of the silicone-based surfactant include, but are not particularly limited to, BYK-306, BYK-307, BYK-333, BYK-341, BYK-345, BYK-346, BYK-347, BYK-348, and BYK-349 (all Trade Names, manufactured by BYK Chemie Japan, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all Trade Names, manufactured by Shin-Etsu Chemical Co., Ltd.), and the like.

Among the above, the acetylene glycol-based surfactants can further improve nozzle clogging recoverability. On the other hand, the fluorine based surfactants and the silicone-based surfactants are preferable from the viewpoint of having an action of uniformly spreading an ink so as not to cause density unevenness or blurring of the ink on a recording medium. Accordingly, the aqueous ink jet ink composition according to this embodiment more preferably contains at least one of the silicone-based surfactants and the fluorine based surfactants and the acetylene glycol-based surfactants.

The lower limit of the content of the acetylene glycol-based surfactants is preferably 0.1% by mass or more, more preferably 0.3% by mass or more, and particularly preferably 0.5% by mass or more based on the total mass of the ink composition. On the other hand, the upper limit of the content is preferably 5% by mass or less, more preferably 3% by mass or less, and particularly preferably 2% by mass or less. When the content of the acetylene glycol-based surfactants is within the ranges mentioned above, the effect that the nozzle clogging recoverability is improved is more easily obtained.

The lower limit of the content of the fluorine based surfactants and the silicone-based surfactants is preferably 0.5% by mass or more and more preferably 0.8% by mass or more. On the other hand, the upper limit of the contents is preferably 5% by mass or less and more preferably 3% by mass or less. When the contents of the fluorine based surfactants and the silicone-based surfactants are within the ranges mentioned above, the surfactants have an action of uniformly spreading an ink so as not to cause density unevenness or blurring of the ink on a recording medium, and thus the contents are preferable.

1.2.6. Other Components

The aqueous ink jet ink composition according to this embodiment may further contain a pH adjuster, a polyolefin wax, an antiseptic/antifungal agent, an antirust agent, a chelating agent, and the like. When the materials are added, the characteristics of the ink composition can be further improved.

Examples of the pH adjuster include, for example, potassium dihydrogen phosphate, disodium hydrogen phosphate, sodium hydroxide, lithium hydroxide, potassium hydroxide, ammonia, diethanol amine, triethanol amine, triisopropanol amine, potassium carbonate, sodium carbonate, sodium hydrogencarbonate, and the like.

Examples of the polyolefin wax include wax manufactured from olefins, such as ethylene, propylene, and butylene, or derivatives thereof and copolymers thereof. Specifically, polyethylene-based wax, polypropylene-based wax, polybutylene-based wax, and the like are mentioned, for example. As the polyolefin wax, commercially available items can be utilized. Specifically, Nopcoat PEM17 (Trade Name, manufactured by San Nopco Limited), Chemipearl W4005 (Trade Name, manufactured by Mitsui Chemicals, Inc.), AQUACER 515 and AQUACER 593 (all Trade Names, manufactured by BYK Chemie Japan, Inc.), and the like are usable.

When the polyolefin wax is added, the slipperiness to physical contact of an image formed on non-ink-absorbing or low-ink-absorbing recording media can be improved and the abrasion resistance of an image can be improved, and therefore the addition is preferable. The content of the polyolefin wax is preferably 0.01% by mass or more and 10% by mass or less and more preferably 0.05% by mass or more and 1% by mass or less based on the total mass of the ink composition. When the content of the polyolefin wax is within the ranges mentioned above, the above-described effects are sufficiently demonstrated.

Examples of the antiseptic.antifungal agent include, for example, sodium benzoate, sodium pentachloro phenol, sodium 2-pyridinethiol-1-oxide, sodium sorbate, sodium dehydroacetate, 1,2-dibenzodithiazoline-3-one, and the like. As commercially-available items, Proxel XL2 zand Proxel GXL (all Trade Names, manufactured by Avecia Inc. company), Denicide CSA and NS-500W (all Trade Names, manufactured by Nagase Chemtex Corporation), and the like are mentioned.

Examples of the antirust include benzotriazole and the like, for example.

Examples of the chelating agent include ethylenediaminetetraacetic acids and salts thereof (disodium dihydrogen ethylenediaminetetraacetate and the like) and the like, for example.

1.2.7. Method for Preparing Ink Composition

The aqueous ink jet ink composition according to this embodiment is obtained by mixing the components described above in an arbitrary order, and then performing filtration or the like, as desired, to remove impurities. As a method for mixing the components, a method is preferably used which includes successively adding materials in a vessel having a stirring device, such as a mechanical stirrer or a magnetic stirrer, and then stirring and mixing the materials. As the filtration method, centrifugal filtration, filter filtration, and the like can be performed as desired.

1.2.8. Physical Properties of Ink Composition

The aqueous ink jet ink composition according to this embodiment has a surface tension at 20° C. of preferably 20 mN/m or more and 40 mN/m or less and more preferably 20 mN/m or more and 35 mN/m or less from the viewpoint of the balance between the image quality and the reliability as an ink jet recording ink. The surface tension can be measured by, for example, confirming the surface tension when a platinum plate is wetted with an ink in a 20° C. environment using an automatic surface tension meter CBVP-Z (Trade Name, manufactured by Kyowa Interface Science Co., LTD.).

The viscosity at 20° C. of the aqueous ink jet ink composition according to this embodiment is preferably 3 mPa·s or more and 10 mPa·s or less and more preferably 3 mPa·s or more and 8 mPa·s or less from the same viewpoint. The viscosity can be measured in a 20° C. environment using a viscoelasticity tester (rheometer) MCR-300 (Trade Name, manufactured by Pysica), for example.

Furthermore, in the aqueous ink jet ink composition according to this embodiment, the viscosity increase rate at 20° C. when 20% by mass of the water contained in the aqueous ink jet ink composition evaporates is within 200%. In the aqueous ink jet ink composition according to this embodiment, the dispersant resin and the resin fine particles are likely to be welded within an ink jet head to form large particles but, due to the fact that the viscosity increase rate at 20° C. when 20% by mass of the water contained in the aqueous ink jet ink composition evaporates is within 200%, an ink excellent in clogging resistance is obtained and, even when the drying of an ink proceeds within the ink jet head, the discharge reliability of the ink jet head is secured. Therefore, an aqueous ink jet ink composition capable of achieving both ink discharge reliability and an image excellent in abrasion resistance can be provided.

Herein, the ink when 20% by mass of water evaporates can be prepared by placing an ink in a 50 ml sample bottle, and then evaporating water in a 40° C. thermostat, for example. For the measurement of the moisture amount in the ink, an infrared moisture meter (Trade Name "FD-660", manufactured by Kett Electric Laboratory) is usable, for example.

In the aqueous ink jet ink composition according to this embodiment, the viscosity increase rate at 20° C. of ink when 20% by mass of water evaporates is preferably within 160%, more preferably within 140%, and still more preferably within 120%. Due to the fact that the viscosity increase rate of the aqueous ink jet ink composition according to this embodiment is within the ranges mentioned above, an aqueous ink jet ink composition can be provided which is formed into an ink having more excellent clogging resistance, so that an image excellent in abrasion resistance can be formed and which has excellent discharge reliability.

Moreover, in the aqueous ink jet ink composition according to this embodiment, the number of particles having a particle diameter of 20 μm or more contained in the aqueous ink jet ink composition when 20% by mass of the water contained in the aqueous ink jet ink composition evaporates is preferably 1000 particles/ml or less, more preferably 500 particles/ml or less, still more preferably 100 particles/ml or less, yet still more preferably 50 particles/ml or less, and particularly preferably 30 particles/ml or less. Due to the fact that the number of particles having a particle diameter of 20 μm or more when the fine particles are welded to form large particles in the aqueous ink jet ink composition according to this embodiment is within the ranges mentioned above, an aqueous ink jet ink composition can be provided which is formed into an ink having more excellent clogging resistance, so that an image excellent in abrasion resistance can be formed and which has excellent discharge reliability.

Furthermore, in the aqueous ink jet ink composition according to this embodiment, the number of particles having a particle diameter of 20 μm or more contained in the aqueous ink jet ink composition when 40% by mass of the water contained in the aqueous ink jet ink composition evaporates is preferably 50000 particles/ml or less, more preferably 1000 particles/ml or less, still more preferably 500 particles/ml or less, yet still more preferably 80 particles/ml or less, and particularly preferably 60 particles/ml or less. In the aqueous ink jet ink composition according to this embodiment, due to the fact that the number of particles having a particle diameter of 20 μm or more which are large particles obtained by the welding of the fine particles is within the ranges mentioned above, an aqueous ink jet ink composition can be provided which is formed into an ink having more excellent clogging resistance, so that an image excellent in abrasion resistance can be formed and which has excellent discharge reliability.

In this embodiment, the number of aggregates in an ink can be counted using an AccuSizer (Trade Name "AccuSizer FX Nano dual", manufactured by BS, Inc.), for example.

In the aqueous ink jet ink composition according to this embodiment, the yield stress of the aqueous ink jet ink composition is preferably 3.5 or less, more preferably 2.0 or less, still more preferably 1.5 or less, yet still more preferably 1.0 or less, and particularly preferably 0.5 or less. Due to the fact that the yield stress of the aqueous ink jet ink composition is within the ranges mentioned above, the aqueous ink jet ink composition more excellent in discharge reliability can be provided.

For the measurement of the yield stress of the aqueous ink jet ink composition, the shear rate and the shearing stress of an ink are determined by the rheometer described above, and then the yield stress can be calculated based on the CASSON expression, for example.

1.3. Reaction Liquid

Next, a reaction liquid usable in an ink jet recording method described later is described. In this embodiment, a reaction liquid application process which is pretreatment using a reaction liquid may be performed as desired before ink jet recording (ink composition application process described later). By performing the reaction liquid application process, an image in which the image quality is improved and the abrasion resistance is further improved can be recorded. Herein, the reaction liquid contains a flocculating agent aggregating the components of the ink composition, an organic solvent, such as a nitrogen containing solvent, and the like.

In this embodiment, the reaction liquid is an auxiliary liquid in which the content of a coloring material is 0.2% by mass or less, which is not the above-described ink composition to be used for coloring a recording medium, and which is caused to be applied to a recording medium before the ink composition to be used.

1.3.1. Flocculating Agent

In this embodiment, the reaction liquid can contain a flocculating agent of aggregating the components of the ink composition. Due to the fact that the reaction liquid contains the flocculating agent, the flocculating agent and the resin contained in the ink composition promptly react in an ink composition application process described later. Thus, the dispersion state of the surface treated pigment or the resin in the ink composition is destroyed, so that the surface treated pigment and the resin aggregate. Then, it is considered that the aggregate prevents the surface treated pigment from entering a recording medium, and therefore the image quality of a recorded image is improved in the image quality.

Examples of the flocculating agent include polyvalent metal salts, cationic polymers, and organic acids, for example. These flocculating agents may be used alone or in combination of two or more kinds thereof. Among the flocculating agents, it is preferable to use at least one kind selected from the group consisting of polyvalent metal salts and cationic polymers from the viewpoint that the reactivity with the resin contained in the ink composition is excellent.

The polyvalent metal salt is a compound which contains divalent or higher polyvalent metal ions and anions to be bonded to the polyvalent metal ions and is soluble in water. Specific examples of the polyvalent metal ions include divalent metal ions, such as $Ca^{2+}$, $Cu^{2+}$, $Ni^{2+}$, $Mg^{2+}$, $Zn^{2+}$, and $Ba^{2+}$; and trivalent metal ions, such as $Al^{3+}$, $Fe^{3+}$, and $Cr^{3+}$. Examples of the anions include $Cl^-$, $I^-$, $Br^-$, $SO_4^{2-}$, $ClO_3^-$, $NO_3^-$, $HCOO^-$, $CH_3COO^-$, and the like. Among the polyvalent metal salts, from the viewpoint of the stability of the reaction liquid and the reactivity as the flocculating agent, a calcium salt and a magnesium salt are preferable.

Preferable examples of the organic acids include, for example, sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of the compounds, or salts thereof. The organic acids may be used alone or in combination of two or more kinds thereof.

Examples of the cationic polymers include a cationic urethane resin, a cationic olefin resin, a cationic allylamine resin, and the like, for example.

As the cationic urethane resin, known substances can be selected as desired to be used. As the cationic urethane resin are commercially-available item are usable and, for example, HYDRAN CP-7010, CP-7020, CP-7030, CP-7040, CP-7050, CP-7060, and CP-7610 (all Trade Names, manufactured by Dainippon Ink and Chemicals, Incorporated), SUPERFLEX 600, 610, 620, 630, 640, and 650 (all Trade Names, manufactured by Daiichi Kogyo Seiyaku Co., Ltd.), urethane emulsion WBR-2120C and WBR-2122C (all Trade Names, manufactured by TAISEI FINE CHEMICAL CO., LTD.), and the like are usable.

The cationic olefin resin has olefins, such as ethylene and propylene, in the structure skeleton, and known substances can be selected as desired to be used. The cationic olefin resin may be in an emulsion state of being dispersed in a solvent containing water, an organic solvent, and the like. As the cationic olefin resin, commercially-available item are usable and, for example, Arrow Base CB-1200 and CD-1200 (all Trade Names, manufactured by manufactured by UNITIKA LTD.), and the like are mentioned.

As the cationic allylamine resin, known substances can be selected as desired to be used and, for example, polyallylamine hydrochloride, polyallylamineamide sulfate, an allylamine hydrochloride.diallylamine hydrochloride copolymer, an allylamine acetate.diallyl amine acetate copolymer, an allylamineacetate.diallylamineacetate copolymer, an allylamine hydrochloride.dimethylallylamine hydrochloride copolymer, an allylamine.dimethyl allylamine copolymer, polydiallylamine hydrochloride, polymethyl diallylamine hydrochloride, polymethyl diallylamineamidosulfate, polymethyl diallylamineacetate, polydiallyl dimethylammoniumchloride, a diallylamine acetate-sulfur dioxide copolymer, a diallylmethylethyl ammoniumehylsulfate.sulfur dioxide copolymer, a methyl diallylamine hydrochloride.sulfur dioxide copolymer, a diallyl dimethylammonium chloride-sulfur dioxide copolymer, a diallyldimethyl ammoniumchloride.acrylamide copolymer, and the like can be mentioned. As such a cationic allylamine resin, commercially-available items are usable and, for example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (all Trade Names, manufactured by NITTOBO MEDICAL CO., LTD.), Hymo Neo-600, Himoloc Q-101, Q-311, Q-501, and Himax SC-505 and SC-505 (all Trade Names, manufactured by HYMO Co., Ltd.), and the like are usable.

In addition thereto, cationic surfactants are also usable. Examples of the cationic surfactants include, for example, primary, secondary, and tertiary amine salt type compounds, an alkylamine salt, a dialkylamine salt, an aliphaticamine salt, a benzalkonium salt, a quaternary ammonium salt, a quaternary alkylammonium salt, an alkylpyridinium salt, a sulfonium salt, a phosphonium salt, an onium salt, and an imidazolinium salt. Specific examples of the cationic surfactants include hydrochlorides, acetates, and the like of lauryl amine, coconut amine, rosin amine, and the like, lauryl trimethyl ammonium chloride, cetyl trimethyl ammonium chloride, benzyl tributyl ammonium chloride, benzalkonium chloride, dimethylethyl lauryl ammoniumethyl sulfate, dimethylethyl octylammoniumethyl sulfate, trimethyl lauryl ammonium hydrochloride, cetyl pyridinium chloride, cetyl pyridinium bromide, dihydroxyethyl laurylamine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The concentration of the flocculating agent of the reaction liquid may be 0.03 mol/kg or more in 1 kg of the reaction liquid. The concentration may be 0.1 mol/kg or more and 1.5 mol/kg or less or may be 0.2 mol/kg or more and 0.9 mol/kg or less in 1 kg of the reaction liquid. The content of the flocculating agent may be 0.1% by mass or more and 25% by mass less, may be 1% by mass or more and 20% by mass or less, or may be 3% by mass or more and 10% by mass or less based on the total mass of the reaction liquid, for example.

1.3.2. Water

In this embodiment, the reaction liquid preferably contains water as the main solvent. The water is a component which evaporates and scatters by drying after the reaction liquid is applied to a recording medium. The water is preferably one from which ionic impurities are removed as much as possible, such as pure water or ultrapure water, e.g., ion exchanged water, ultrafiltration water, reverse osmosis water, and distilled water. The use of water sterilized by irradiation with ultraviolet rays, hydrogen peroxide addition, or the like is preferable because the generation of mold or bacteria can be suppressed when the reaction liquid is stored for a long period of time. The content of the water contained in the reaction liquid can be set to 40% by mass or more, preferably 50% by mass or more, more preferably 60% by mass or more, and still more preferably 70% by mass or more based on the total mass of the reaction liquid.

1.3.3. Organic Solvent

In this embodiment, the reaction liquid may contain an organic solvent. Due to the fact that the reaction liquid contains an organic solvent, the wettability of the reaction liquid to a recording medium can be improved. As the organic solvent, the same organic solvents as those mentioned as examples in the ink composition described above are usable. The content of the organic solvent is not particularly limited and can be set to 10% by mass or more 80% by mass or less and is preferably 15% by mass or more and 70% by mass or less based on the total mass of the reaction liquid.

In the reaction liquid, the content of a water-soluble organic solvent having a normal boiling point of more than 280° C. preferably does not exceed 5% by mass, more preferably does not exceed 3% by mass, still more preferably does not exceed 2% by mass, yet still more preferably does not exceed 1% by mass, and particularly preferably does not exceed 0.5% by mass as the organic solvent as with the aqueous ink jet ink composition. In the case described above, the drying properties of the reaction liquid are good, and therefore the reaction liquid is promptly dried and also the stickiness of the obtained recorded matter decreases and the abrasion resistance is excellent.

1.3.4. Surfactant

In this embodiment, a surfactant may be added to the reaction liquid. By adding a surfactant, the surface tension of the reaction liquid can be reduced and the wettability with a recording medium can be improved. Among surfactants, acetylene glycol-based surfactants, silicone-based surfactants, and fluorine based surfactants can be preferably used, for example. As specific examples of the surfactants, the same surfactants as those mentioned as examples in the aqueous ink jet ink composition are usable. The content of the surfactants is not particularly limited and can be set to 0.1% by mass or more and 1.5% by mass or less based on the total mass of the reaction liquid.

1.3.5. Other Components

In this embodiment, the pH adjuster, the antiseptic.antifungal agent, the antirust, the chelating agent, and the like described above may be added to the reaction liquid as desired.

1.3.6. Method for Preparing Reaction Liquid

The reaction liquid for use in this embodiment can be produced by dispersing-mixing the above-described components by a suitable method. A target reaction liquid can be obtained by sufficiently stirring the above-described components, and then performing filtration for removing coarse particles and foreign substances causing clogging.

1.3.7. Physical Properties of Reaction Liquid

In this embodiment, when discharged with an ink jet head, the reaction liquid has a surface tension at 20° C. of preferably 20 mN/m or more and 40 mN/m or less, more preferably 23 mN/m or more and 35 mN/m or less, and still more preferably 25 mN/m or more and 33 mN/m or less. The surface tension can be measured by, for example, confirming the surface tension when a platinum plate is wetted with an ink in a 20° C. environment using an automatic surface tension meter CBVP-Z (Trade Name, manufactured by Kyowa Interface Science Co., LTD.).

From the same viewpoint, in this embodiment, the viscosity at 20° C. of the reaction liquid is preferably 3 mPa·s or more and 10 mPa·s or less and more preferably 3 mPa·s or more and 8 mPa·s or less. The viscosity can be measured in a 20° C. environment using a rheometer MCR-300 (Trade Name, manufactured by Pysica), for example.

1.4. Recording Medium

The above-described aqueous ink jet ink composition is usable for ink jet recording to various recording media and, particularly, in recording to non-ink-absorbing or low-ink-absorbing recording media, an image excellent in abrasion resistance can be obtained, and therefore the above-described aqueous ink jet ink composition can be preferably used.

Examples of the ink-absorbing recording medium include plain paper, such as fine quality paper and recycled paper, paper for exclusive use for ink jet provided with an ink receiving layer having an ink absorbing layer, and the like, for example.

Examples of the non-ink-absorbing recording medium include those in which plastic is coated on a base material, such as a plastic film and paper which are not surface treated for ink jet recording (i.e., not having an ink absorbing layer), those in which a plastic film is bonded to the base material, and the like, for example. Examples of the plastic as used herein include polyvinyl chloride, polyethylene terephthalate, polycarbonate, polystyrene, polyurethane, polyethylene, polypropylene, and the like. Examples of a low-ink-absorbing recording medium include printing paper, such as art paper, coated paper, and matte paper. In this specification, the non-ink-absorbing or low-ink-absorbing recording medium is also simply referred to as "plastic medium".

Herein, the "non-ink-absorbing or low-ink-absorbing recording medium" refers to a "recording medium in which the water absorption amount from the initiation of contact to 30 msec$^{1/2}$ is 10 mL/m$^2$ or lower in the Bristow method". This Bristow method is the most spread method as a method for measuring the liquid absorption amount in a short time and is used also in the Japan Technical Association of the Pulp and Paper Industry (JAPAN TAPPI). The details of a test method are described in "Liquid Absorbency Test Method of Paper and Paperboard (Bristow Method)" of Standard No. 51 of "JAPAN TAPPI paper pulp test method, 2000".

Examples of the non-ink-absorbing recording medium include, those in which plastic is coated on a base material, such as a plastic film and paper not having an ink absorbing layer, those in which a plastic film is bonded to the base material, and the like, for example. Examples of the plastic as used herein include polyvinyl chloride, polyethylene terephthalate, polycarbonate, polystyrene, polyurethane, polyethylene, polypropylene, and the like.

Examples of the low-ink-absorbing recording medium include a recording medium provided with a coating layer for receiving an ink on the surface. For example, examples of a recording medium containing paper as a base material include printing paper, such as art paper, coated paper, and matte paper, and when a base material is a plastic film, those in which a hydrophilic polymer is applied to the surfaces, of polyvinyl chloride, polyethylene terephthalate, polycarbonate, polystyrene, polyurethane, polyethylene, polypropylene, and the like, and those in which particles of silica, titanium, and the like are applied with a binder are mentioned. These recording media may be transparent recording media.

Moreover, the aqueous ink jet ink composition is usable also to non-ink-absorbing or low-ink-absorbing recording media having irregularities on the surface, such as an embossed medium.

When the ink jet recording apparatus 1 of FIG. 1 is a serial-type recording apparatus, a preferable width of the recording medium M is preferably 3.2 μm or less. In this case, the time when the recording medium M faces the ink jet head 2 during one main scanning, i.e., the time when the nozzle 22 which is not used during the one scanning receives heat from the recording medium M, is 12 seconds or less, the drying and composition changes of the ink composition in the nozzle 22 can be suppressed, and the welding of the resin to the inner wall of the nozzle 22 can be reduced. As a result, an ink jet recording method capable of forming an image excellent in abrasion resistance and having excellent discharge reliability is obtained. The lower limit of the preferable width of the recording medium is 30 cm or more.

2. Ink Jet Recording Method

The ink jet recording method according to this embodiment includes an ink composition application process of discharging an ink composition charged into a pressure chamber of an ink jet head through a nozzle to be applied to a recording medium, in which the ink jet head has a level difference ranging from a portion where the ink composition moves toward the nozzle from the pressure chamber to the nozzle and the ink composition is the aqueous ink jet ink composition according to this embodiment. Hereinafter, a description is given with reference to the drawings.

2.1. Reaction Liquid Application Process

The ink jet recording method according to this embodiment may include a reaction liquid application process of causing the reaction liquid described above to be applied to a recording medium before causing the ink composition to be applied to a recording medium before an ink composition application process. By performing the reaction liquid application process, an image with improved image quality and more excellent in abrasion resistance can be recorded.

The recording medium M is preferably heated with the preheater 7 illustrated in FIG. 1 before the reaction liquid application process or the IR heater 3 or the platen heater 4 illustrated in FIG. 1 in the reaction liquid application process. By causing the reaction liquid to be applied onto the heated recording medium M, the reaction liquid discharged onto the recording medium M is likely to wet and spread on the recording medium M, and thus can be uniformly applied. Therefore, the reaction liquid sufficiently reacts to an ink caused to be applied in the ink composition application process described later, so that excellent image quality can be obtained. Moreover, since the reaction liquid is uniformly applied on the recording medium M, the application amount can be reduced. Therefore, an abrasion resistance reduction of the obtained image can be suppressed.

Herein, the temperature of the surface of the recording medium M in causing the reaction liquid to be applied to the recording medium M is preferably 25° C. or more and 60° C. or less, more preferably 30° C. or more and 50° C. or less, and still more preferably 35° C. or more and 45° C. or less. When the temperature of the reaction liquid is within the ranges mentioned above, the reaction liquid can be uniformly applied to the recording medium M, and the image quality can be improved. Moreover, the influence by the heat on the ink jet head 2 can be suppressed.

The amount of the reaction liquid of the reaction liquid application process is preferably 10 mg/inch$^2$ or less, more preferably 0.1 to 10 mg/inch$^2$, still more preferably 0.3 to 5 mg/inch$^2$, particularly preferably 0.5 to 3 mg/inch$^2$, and more particularly preferably 0.7 to 2 mg/inch$^2$. The maximum amount of the reaction liquid of the reaction liquid application process is preferably 0.5 to 10 mg/inch$^2$, more preferably 0.5 to 5 mg/inch$^2$, still more preferably 0.7 to 3 mg/inch$^2$, and particularly preferably 0.7 to 2 mg/inch$^2$. When the amount and the maximum amount are within the ranges mentioned above, more excellent image quality is likely to be obtained and the required time for the application process can be shortened. Thus, adverse effects on recorded matter due to the fact that the amount to a recording medium of the organic solvent having a normal boiling point of 280° C. or more and the like contained in the reaction liquid is excessively large are prevented, and thus the ranges mentioned above are preferable.

The amount of the reaction liquid of the reaction liquid application process is the amount of the reaction liquid of the reaction liquid application process in a region where the reaction liquid application process and the ink composition application process are performed in the ink jet recording method and the region has a region where the amount is at least the amount of the reaction liquid of the reaction liquid application process.

The maximum amount of the reaction liquid of the reaction liquid application process is the amount of the reaction liquid in a region where the amount of the reaction liquid of the reaction liquid application process is the maximum in the region where the reaction liquid application process and the ink composition application process are performed in the ink jet recording method. Accordingly, the region where the reaction liquid application process and the ink composition application process are performed may have other regions where the amount is smaller than the maximum amount.

It is preferable that the amount of the reaction liquid is within the ranges mentioned above in the region where the amount of the ink composition is the maximum amount of the ink composition in the region where the reaction liquid application process and the ink composition application process are performed. It is more preferable that the amount of the reaction liquid is within the ranges mentioned above in a range from a region where the amount of the ink composition is the maximum amount of the ink composition to a region where the amount of the ink composition is 60% by mass of the maximum amount in the region where the reaction liquid application process and the amount of the reaction liquid are performed.

The application of the reaction liquid may be performed by the discharge by the ink jet head 2 as described above and the other methods, such as a method including applying the reaction liquid with a roll coater or the like and a method including ejecting the reaction liquid, are mentioned, for example. The aqueous ink jet ink composition application process and the reaction liquid application process according to this embodiment may be simultaneously performed.

2.2. Ink Composition Application Process

The ink composition application process is a process of discharging the ink composition charged into the pressure chamber 21 of the ink jet head 2 illustrated in FIG. 2 through the nozzle 22 to be caused to be applied to the recording medium M. By the process, an image containing the ink compositions is formed on the surface of the recording medium M.

Herein, in this embodiment, the "image" refers to a recording pattern formed from a dot group and also includes a text printing and a solid image. The "solid image" means an image pattern is an image in which dots are recorded in all the pixels, the pixel which is the minimum recording unit region specified by the recording resolution, and a recording region of a recording medium is covered with an ink, so that the ground of the recording medium is not seen.

In this embodiment, the ink jet head 2 has the level difference 22a ranging from a portion where the ink composition moves toward the nozzle 22 from the pressure chamber 21 to the nozzle 22 illustrated in FIG. 2.

The maximum amount of the ink composition per unit area of a recording medium is preferably 5 to 20 mg/inch$^2$, more preferably 7 to 15 mg/inch$^2$, and still more preferably 8 to 13 mg/inch$^2$. The maximum amount of the ink composition per unit area of a recording medium within the ranges mentioned above is preferable because a useful image can be recorded or excellent image quality is obtained.

When causing the ink composition to be applied to the recording medium M, it is preferable to cause the ink composition to be applied to the heated recording medium M. By causing the ink composition to be applied to the heated recording medium M, the drying properties of the ink composition on the recording medium M increase, and therefore an image in which the occurrence of bleeding is suppressed and which is more excellent in the film formability of an ink coating film and excellent in abrasion resistance can be formed.

The surface temperature of the recording medium M during causing an ink to be applied is preferably 25° C. or more and 60° C. or less, more preferably 30° C. or more and 50° C. or less, still more preferably 35° C. or more and 45° C. or less. Thus, the radiant heat received from the IR heater 3 and the platen heater 4 is less or eliminated, and therefore the drying and composition changes of the ink composition in the ink jet head 2 can be suppressed and the welding of the resin to the inner wall of the ink jet head 2 is suppressed, so that the ink jet recording method excellent in discharge stability is obtained.

When the ink jet recording apparatus 1 is a serial printer, the time when the recording medium M faces the ink jet head 2 during one main scanning is preferably 12 seconds or less. The upper limit of the time is more preferably 10 seconds or less and particularly preferably 6 seconds or less. The lower limit of the time is preferably 1 second or more, more preferably 2 seconds or more, and particularly preferably 3 seconds or more. The time when the recording medium M faces the ink jet head 2 during one main scanning is equal to the time when the nozzle 22 not used during one scanning receives heat from the recording medium M. More specifically, when the time is within the ranges mentioned above, the time when the nozzle 22 not used during one main scanning receives heat from the recording medium M is sufficiently short, and therefore the drying and composition changes of the ink composition in the nozzle 22 can be suppressed and the welding of resin to the inner wall of the nozzle 22 can be reduced.

As a result, a landing deviation of an ink in continuous printing can be suppressed and the clogging recoverability of the nozzle 22 is further improved.

2.3. Drying Process

The ink jet recording method according to this embodiment may have a drying process of drying the surface of the recording medium M to which the ink composition adheres with the curing heater 5 illustrated in FIG. 1 after the ink composition application process. Thus, the resin contained in the ink composition on the recording medium M melts, so that the film formability of a coating film is improved, and thus an image excellent in abrasion resistance can be produced. The drying temperature by the curing heater 5 is preferably 40° C. or more and 120° C. or less, more preferably 60° C. or more and 100° C. or less, and still more preferably 80° C. or more and 90° C. or less. Due to the fact that the drying temperature is within the ranges mentioned above, the film formability or the abrasion resistance is further improved. The ink composition on the recording medium M may be cooled by the cooling fan 6 illustrated in FIG. 1. In this case, an ink film can be further formed with sufficient adhesiveness on the recording medium M.

2.4. Cleaning Process

The ink jet recording method according to this embodiment may include a cleaning process of discharging an ink composition from an ink jet head by the action from the outside of the ink jet head by a unit other than a pressure generating unit for discharging an ink for recording, i.e., by external mechanisms which are not mechanisms for discharging an ink for recording provided in the ink jet head.

As described above, examples of the mechanism for discharging an ink for recording provided in the ink jet head 2 include the piezoelectric element 23, such as a piezo element provided in the pressure chamber 21 and giving pressure to an ink. On the other hand, the cleaning process is a process of giving pressure to the ink jet head 2 from the outside to discharge an ink composition from the nozzle 22, for example. By providing the process, even when there is a concern that a resin is welded to the inner wall of the ink jet head 2, the ink jet recording method can be further improved in the respects of suppressing the welding and improving the clogging properties.

Moreover, it is preferable to perform control to perform recording for 1 hour or more without performing the cleaning process in the ink jet recording method according to this embodiment. By performing the control as described above, the recording rate is not reduced due to the interruption of the recording in connection with the process and the like, and therefore the control is preferable. Even in such a case, by the use of the above-described ink composition, the ink jet recording method can be obtained in which a landing deviation of an ink in continuous printing can be suppressed, which can form an image excellent in abrasion resistance, and which is excellent in discharge reliability.

Examples of the above-described other mechanisms include a mechanism of giving pressure, such as giving suction pressure (negative pressure) or giving positive pressure from the upstream of a head. The discharge by the mechanisms is not ink discharge (flushing) by the function of an ink jet head itself. More specifically, the discharge is not discharge using a function of discharging an ink from an ink jet head in recording.

The recording time may not be continuous and the recording may be stopped insofar as a pressure is given to an ink jet head from the outside, so that an ink composition is discharged from a nozzle. Herein, the recording time is the recording time also including recording and the stopping time of the recording. The recording time is preferably 1 hour or more, more preferably 1.5 hours or more, still more preferably 2 hours or more, and particularly preferably 3 hours or more. The upper limit of the recording time is not limited and is preferably 10 hours or less, more preferably 5 hours or less, and still more preferably 4 hours or less.

It is preferable for the ink jet recording method according to this embodiment not to perform the above-described cleaning process during recording in one recording in the respects described above. It is preferable to perform the above-described cleaning process at least either before recording or after recording in the respects described above.

As described above, due to the fact that the ink jet recording method according to this embodiment has the ink composition application process of discharging the ink composition charged into a pressure chamber of an ink jet head through a nozzle to cause the ink composition to be applied to a recording medium, the ink jet head has a level difference ranging from a portion where the ink composition moves toward the nozzle from the pressure chamber to the nozzle and the ink composition is the aqueous ink jet ink composition according to this embodiment, the ink jet recording method can be provided in which the film formability of an ink coating film is improved, so that an image excellent in abrasion resistance can be formed in recording using the ink jet head having the level difference nozzle and which is excellent in discharge reliability even when the drying of an ink proceeds within the ink jet head because an ink excellent in clogging resistance is used.

This embodiment may be a method for controlling the above-described ink jet recording apparatus. The control method is a control method including performing control to perform the above-described ink jet recording method or the above-described cleaning process by a control unit provided in the ink jet recording apparatus.

3. Examples

Hereinafter, the embodiment of the invention is described with reference to Examples and Comparative Examples but the embodiment is not limited only to Examples.

3.1. Preparation of Ink Composition

Components were mixed and stirred so as to have the compounding ratios of Table 1 to give inks 1 to 9. All the numerical values in Table 1 indicate % by mass and pure water was added so that the total mass of an ink composition was 100% by mass.

TABLE 1

| | Boiling point | SP value | Ink 1 | Ink 2 | Ink 3 | Ink 4 | Ink 5 |
|---|---|---|---|---|---|---|---|
| PB15-3 pigment | — | — | 4% | 4% | 4% | 4% | 4% |
| Pigment dispersant resin A | — | 10.3 | 2% | 2% | 2% | 0% | 2% |
| Pigment dispersant resin B | — | 8.6 | 0% | 0% | 0% | 2% | 0% |
| 1,2-hexanediol | 216 | 12.1 | 5% | 0% | 5% | 5% | 20% |
| Propylene glycol | 188 | 14.2 | 5% | 15% | 10% | 5% | 5% |
| 2-pyrrolidone | 245 | 11.5 | 10% | 10% | 0% | 10% | 5% |
| Glycerol | 290 | 16.7 | 0% | 0% | 0% | 0% | 0% |
| BYK348 | — | — | 1% | 1% | 1% | 1% | 1% |
| DF110D | — | — | 0.50% | 0.50% | 0.5% | 0.50% | 0.50% |
| Resin fine particles (Styrene • acrylic resin) | — | 9.5 | 3% | 3% | 3% | 3% | 3% |
| Resin fine particles (Acrylic resin) | — | 8 | 0% | 0% | 0% | 0% | 0% |
| Pure water | 100 | — | 70% | 65% | 75% | 70% | 60% |
| Pigment dispersant resin and resin fine particles having difference in SP value within 2 | | | Contained | Contained | Contained | Contained | Contained |

| | Boiling point | SP value | Ink 6 | Ink 7 | Ink 8 | Ink 9 |
|---|---|---|---|---|---|---|
| PB15-3 pigment | — | — | 4% | 4% | 4% | 4% |
| Pigment dispersant resin A | — | 10.3 | 2% | 2% | 2% | 2% |
| Pigment dispersant resin B | — | 8.6 | 0% | 0% | 0% | 0% |
| 1,2-hexanediol | 216 | 12.1 | 0% | 0% | 0% | 20% |
| Propylene glycol | 188 | 14.2 | 5% | 5% | 5% | 5% |
| 2-pyrrolidone | 245 | 11.5 | 10% | 10% | 10% | 5% |
| Glycerol | 290 | 16.7 | 10% | 10% | 0% | 0% |
| BYK348 | — | — | 1% | 1% | 1% | 1% |
| DF110D | — | — | 1% | 1% | 1% | 1% |
| Resin fine particles (Styrene • acrylic resin) | — | 9.5 | 3% | 0% | 0% | 0% |
| Resin fine particles (Acrylic resin) | — | 8 | 0% | 3% | 3% | 3% |
| Pure water | 100 | — | 65% | 65% | 75% | 60% |
| Pigment dispersant resin and resin fine particles having difference in SP value within 2 | | | Contained | Not Contained | Not Contained | Not Contained |

The used materials are as follows.
Pigment
  PB15:3 (manufactured by Dainichiseika Color & Chemicals Mfg. Co., Ltd., Trade Name "Chromofine Blue", C.I. Pigment Blue 15:3)
Pigment Dispersant Resin
  Pigment dispersant resin A (Trade Name "Joncryl 586", manufactured by BASF A.G., styrene acrylic resin)
  Pigment dispersant resin B (Trade Name "BYK2015", manufactured by BYK Chemie Japan, Inc., acrylic resin)
Surfactant
  BYK348 (Trade Name, manufactured by BYK Chemie Japan, Inc., silicone-based surfactant)
  DF110D (Trade Name "Surfynol DF110D", manufactured by Nisshin Chemical Co., Ltd., acetylene glycol-based surfactant)
Resin Fine Particles
  Styrene.acrylic resin (Trade Name "ARUFON UF-5022", manufactured by TOAGOSEI CO., LTD., Tg of 75° C.)
  Acrylic resin (Trade Name "JE-1056", manufactured by SEIKO PMC CORPORATION, Tg of 81° C.)
3.2. Preparation of Reaction Liquid
  Components were mixed.stirred according to the compositions given in Table 2, and then filtered with a 10 μm membrane filter to prepare a reaction liquid. All the numerical values in Table 2 indicate % by mass and pure water was added so that the total mass of the reaction liquid was 100% by mass.

TABLE 2

|  | Reaction liquid |
| --- | --- |
| Magnesium sulfate | 6% |
| 1,2-hexanediol | 5% |
| 2-pyrrolidone | 15% |
| BYK348 | 0% |
| Pure water | Balance |

BYK348 among the components given in Table 2 is the same component as that used for the ink above.

3.3. Evaluation Test
  First, each ink was measured for the number of particles having a particle diameter of 20 μm or more in the ink when 20% by mass of water evaporated and the number of particles in the ink when 40% by mass of water evaporated. The ink when 20% by mass of water evaporated was prepared by placing an ink in a 50 ml sample bottle, and then evaporating water in a 40° C. thermostat. For the measurement of the moisture amount in the ink, an infrared moisture meter (Trade Name "FD-660", manufactured by Kett Electric Laboratory) was used. The number of aggregates in the ink was measured under the conditions of Loop=5 ml and DF2=50 using an AccuSizer (Trade Name "AccuSizer FX Nano dual", manufactured by BS, Inc.).
  The initial viscosity of the ink before evaporating water and the viscosity of the ink when 20% by mass of water evaporated were also measured. For the measurement, the measurement was performed using a rheometer (Trade Name "MCR-300", manufactured by Physica) under the conditions of 200 rpm.
  Next, recording was performed using each ink, and then the obtained recorded matter was evaluated for abrasion resistance, coloring, and clogging properties.

TABLE 3

|  | Ex. 1 | Ex. 2 | Ex. 3 | Ex. 4 | Ex. 5 | Ex. 6 |
| --- | --- | --- | --- | --- | --- | --- |
| Reaction liquid application process | Reaction liquid | — | Reaction liquid | Reaction liquid | Reaction liquid | Reaction liquid |
| Ink composition application process | Ink 1 | Ink 1 | Ink 1 | Ink 2 | Ink 3 | Ink 4 |
| Initial viscosity (Pa · s) | 5.3 | 5.3 | 5.3 | 6.1 | 4.8 | 5.5 |
| Viscosity in 20% evaporation (Pa · s) | 6.2 | 6.2 | 6.2 | 7.4 | 7.3 | 7.1 |
| Viscosity increase rate (%) | 117 | 117 | 117 | 121 | 152 | 129 |
| Number of particles of 20 μm or more in 20% evaporation | 24 | 24 | 24 | 35 | 65 | 71 |
| Number of particles of 20 μm or more in 40% evaporation | 105 | 105 | 105 | 1024 | 201 | 345 |
| Recording temperature (° C.) | 40 | 40 | 35 | 40 | 40 | 40 |
| Abrasion resistance | A | A | B | A | B | B |
| Coloring | A | B | A | B | A | A |
| Clogging properties | A | A | A | B | A | A |

|  | Comp. Ex. 1 | Comp. Ex. 2 | Comp. Ex. 3 | Comp. Ex. 4 | Comp. Ex. 5 |
| --- | --- | --- | --- | --- | --- |
| Reaction liquid application process | Reaction liquid | Reaction liquid | Reaction liquid | Reaction liquid | Reaction liquid |
| Ink composition application process | Ink 5 | Ink 6 | Ink 7 | Ink 8 | Ink 9 |
| Initial viscosity (Pa · s) | 6.2 | 5.5 | 5.7 | 4.7 | 6.1 |
| Viscosity in 20% evaporation (Pa · s) | 14.1 | 6.4 | 7.2 | 10.2 | 15.3 |
| Viscosity increase rate (%) | 227 | 116 | 126 | 217 | 251 |
| Number of particles of 20 μm or more in 20% evaporation | 980 | 51 | 121 | 133 | 677 |
| Number of particles of 20 μm or more in 40% evaporation | 4512 | 4677 | 102856 | 128500 | 3501 |
| Recording temperature (° C.) | 40 | 40 | 40 | 40 | 40 |
| Abrasion resistance | B | C | C | C | B |
| Coloring | B | C | B | B | B |
| Clogging properties | D | A | A | C | C |

3.3.1. Evaluation of Abrasion Resistance
  The ink composition and the reaction liquid were charged into an ink jet printer (Trade Name "PX-G930", manufactured by Seiko Epson Corp.), and then recording was performed on a recording medium (Clear proof film, manufactured by Seiko Epson Corp.). Specifically, first, the reaction liquid was ink jet-applied with a resolution of 1440×1440 dpi with an amount of 1.0 mg/inch². Next, the recording medium was rewound, the ink was ink jet-applied with a resolution of 720×720 dpi with an amount of 10.0 mg/inch² in such a manner as to be overlapped with the reaction liquid layer, and then a fill pattern recordable at 100% duty was produced to be used. Herein, the surface temperature of the recording medium was controlled to be a temperature given in Table 3. Thereafter, the peeling state of the recording surface or the ink transfer state to a cotton cloth when the recording surface of recorded matter allowed to stand in a laboratory under room temperature (25° C.) conditions for 1 hour was rubbed 20 times with the cotton cloth under a 200 g load using a Gakushin type rubbing fastness tester AB-301 (Trade Name, manufactured by TESTER SANGYO CO., LTD.) was confirmed, whereby the abrasion resistance was evaluated according to the following criteria.
Evaluation Criteria
  A: No scratches or peeling were/was observed.
  B: Scratches or peeling of 1% or less of the stroke area were/was observed.
  C: Scratches or peeling of 1% or more and less than 10% of the stroke area were/was observed.
  D: Scratches or peeling of 10% or more and less than 50% of the stroke area were/was observed.
  E: Scratches or peeling of 50% or more of the stroke area were/was observed.
3.3.2. Evaluation of Coloring
The OD value of a solid pattern of a recorded portion of the recorded matter obtained in 3.3.1. was measured, and then the recorded matter was evaluated according to the following criteria. For the measurement, a spectrum photometer/spectral radiance meter Spectrolino (Trade Name "Spectrolino", manufactured by Gretag) was used.
Evaluation Criteria
  A: The OD value of the recorded portion is 1.5 or more.
  B: The OD value of the recorded portion is 1.2 or more and less than 1.5.
  C: The OD value of the recorded portion is less than 1.2.
3.3.3. Clogging Properties (Discharge Reliability)
The ink composition was charged into an ink jet printer (Trade Name "PX-H8000", manufactured by Seiko Epson Corp.), and then allowed to stand for 1 month in a cap opened state. Thereafter, cleaning was performed 3 times, and then the number of nozzle drop outs was judged to be evaluated according to the following criteria.
Evaluation Criteria
  A: The number of nozzle drop outs is 0.
  B: The number of nozzle drop outs is 1 to 5.
  C: The number of nozzle drop outs is 6 to 20.
  D: The number of nozzle drop outs is 21 or more.
3.4. Evaluation Results
The evaluation test results are given in the lower side of Table 3.

In all Examples, the results were obtained that the evaluation is B or higher, images excellent in abrasion resistance were formed, and the ink discharge reliability was excellent. The results were obtained that a comparison between Examples 1 and 2 showed that the coloring was higher when the reaction liquid was used and a comparison between Examples 1 and 3 showed that the abrasion resistance was more excellent when the recording temperature was higher. A comparison between Examples 1 and 4 showed that, when the number of coarse particles when 40% of the moisture in the ink evaporated was smaller, a viscosity increase was suppressed and the coloring or clogging property result was good. The result was obtained that a comparison between Examples 1 and 5 showed that, when the ink contained a nitrogen containing solvent, the abrasion resistance was more excellent. A comparison between Examples 1 and 6 showed that, when the number of coarse particles when 20% of the moisture in the ink evaporated and the number of coarse particles when 40% of the moisture in the ink evaporated were smaller, a viscosity increase was suppressed and the abrasion resistance result was good.

On the other hand, in Comparative Example 1, 20% by mass or more of the solvent in which the difference in the SP value from the resin was within 2 was contained and the viscosity increase rate when 20% by mass of the water in the ink evaporated exceeded 200%, and therefore the number of coarse particles increased and all the evaluations were lower than the evaluations of Example 1, particularly the clogging properties deteriorated. In Comparative Example 2, the ink contained glycerol in a proportion exceeding 5% by mass, and therefore the number of coarse particles increased and the abrasion resistance and the coloring deteriorated but, since glycerol was contained, the clogging properties were good. In Comparative Example 3, the difference in the SP values between the dispersant resin and the resin of the resin fine particles exceeded 2 and also glycerol was contained, and therefore, even when a large number of coarse particles were contained, the clogging properties were good but the abrasion resistance and the coloring deteriorated. In Comparative Example 4, the difference in the SP values between the dispersant resin and the resin of the resin fine particles exceeded 2 and glycerol was not contained, and therefore all the evaluations deteriorated. In Comparative Example 5, the difference in the SP values between the dispersant resin and the resin of the resin fine particles exceeded 2 and the viscosity increase rate when 20% by mass of the water in the ink evaporated exceeded 200%, and therefore the number of coarse particles increased and all the evaluations were lower than the evaluations of Example 1 because the viscosity increase rate when 20% by mass of the water in the ink evaporated exceeded 200% as with Comparative Example 1.

As described above, in Examples, an ink jet recording method having high abrasion resistance and excellent in discharge reliability was able to be provided.

The invention is not limited to the above-described embodiment and can be modified in various manners. For example, the invention includes the substantially same structure (e.g., structure with same function(s), method(s), and result(s) or structure with the same object(s) and effect(s)) as the structures described with the embodiment. The invention also includes a structure in which non-essential portions of the structures described in the embodiment are replaced. The invention also includes a structure that can demonstrate the same effects or a structure that can achieve the same objects as those in the structures described with the embodiment. The invention also includes a structure in which known techniques are added to the structures described in the embodiment.

The entire disclosure of Japanese Patent Application No. 2017-076753 filed Apr. 7, 2017 is expressly incorporated by reference herein.

What is claimed is:
1. An ink jet recording method comprising:
  discharging an aqueous ink jet ink composition from a pressure chamber of an ink jet head through a nozzle onto a recording medium,
  wherein the recording medium is in a heated state when the aqueous ink jet ink composition is applied to the recording medium,
  the ink jet head has a step between the pressure chamber and the nozzle, and
  the aqueous ink jet ink composition includes:
    a pigment dispersed with a dispersant resin;
    resin fine particles;
    water;
    an organic solvent; and
    a nitrogen-containing solvent, wherein a content of an organic solvent having a normal boiling point of 280° C. or more is no more than 5% relative to a total mass of the aqueous ink jet ink composition, a viscosity increase rate of the aqueous ink jet ink composition is within 200% at 20° C. when 20% by mass of the water evaporates, a difference in solubility parameter values between the dispersant resin and a resin of the resin fine particles is within 2, a difference in solubility parameter values between the organic solvent and the dispersant resin or the resin of the resin fine particles is within 2, a content of the organic solvent in which the difference in the solubility parameter values between the organic solvent and the dispersant resin or the resin of the resin fine particles is within 2 is 20% by mass or less, and a content of the nitrogen-containing solvent is 5% by mass or more based on the total mass of the aqueous ink jet ink composition.

2. The ink jet recording method according to claim 1, wherein a number of particles having a particle diameter of 20 μm or more contained in the aqueous ink jet ink composition is 50 particles/ml or less when 20% by mass of the water contained evaporates.

3. The ink jet recording method according to claim 1, wherein a number of particles having a particle diameter of 20 μm or more contained in the aqueous ink jet ink composition is 1000 particles/ml or less when 40% by mass of the water evaporates.

4. The ink jet recording method according to claim 1, wherein a content of an organic solvent in which the difference in the solubility parameter values from the dispersant resin or the resin of the resin fine particles is within 2 is 5 to 20% by mass.

5. The ink jet recording method according to claim 1, wherein a content of an organic solvent in which the difference in the solubility parameter values between the dispersant resin and the resin of the resin fine particles is within 2 is 10% by mass or less.

6. The ink jet recording method according to claim 1, wherein the difference in the solubility parameter values between the dispersant resin and the resin of the resin fine particles is 0.5 or more and 2 or less.

7. The ink jet recording method according to claim 1, further comprising:

applying a reaction liquid to the recording medium prior to discharging the aqueous ink jet ink composition to the reaction liquid.

8. The ink jet recording method according to claim 1, wherein the ink jet head has a nozzle density of 300 dpi or more.

9. The ink jet recording method according to claim 1, further comprising:

recording for at least 1 hour without performing a supplemental cleaning process by an external mechanism independent of the ink jet head.

10. The ink jet recording method according to claim 1, wherein a content of the nitrogen-containing solvent is 5 to 15% by mass based on the total mass of the aqueous ink jet ink composition.

11. The ink jet recording method according to claim 1, wherein the aqueous ink jet ink composition includes a glycol as the organic solvent.

12. The ink jet recording method according to claim 11, wherein a content of the glycol is 5% by mass or more, based on the total mass of the aqueous ink jet ink composition.

13. The ink jet recording method according to claim 1, wherein a temperature of the recording medium upon application of the aqueous ink jet ink composition is 30 to 45° C.

14. The ink jet recording method according to claim 1, wherein the dispersant resin includes styrene acrylic resin, and the resin of the resin fine particles includes styrene acrylic resin.

15. The ink jet recording method according to claim 1, wherein a content of the dispersant resin is 0.5 to 5% by mass based on the total mass of the aqueous ink jet ink composition, and a content of the resin of the resin fine particles is 3 to 15% by mass based on the total mass of the aqueous ink jet ink composition.

16. The ink jet recording method according to claim 1, wherein the step is formed in a range where a distance from a nozzle opening of the nozzle to the pressure chamber is within a range of 20 to 100 μm.

17. The ink jet recording method according to claim 1, wherein a content of an organic solvent having a normal boiling point of 280° C. or more is no more than 2% relative to a total mass of the aqueous ink jet ink composition.

18. The ink jet recording method according to claim 1, wherein the aqueous ink jet ink composition includes a polyolefin wax.

* * * * *